United States Patent
Brinnand

(10) Patent No.: US 9,990,383 B2
(45) Date of Patent: Jun. 5, 2018

(54) CONSTRUCTING A DATA ADAPTOR IN AN ENTERPRISE SERVER DATA INGESTION ENVIRONMENT

(71) Applicant: EBAY INC., San Jose, CA (US)

(72) Inventor: John Peter Brinnand, San Jose, CA (US)

(73) Assignee: EBAY INC., San Jose, CA (US)

( * ) Notice: Subject to any disclaimer, the term of this patent is extended or adjusted under 35 U.S.C. 154(b) by 286 days.

(21) Appl. No.: 14/812,360

(22) Filed: Jul. 29, 2015

(65) Prior Publication Data

US 2016/0321308 A1    Nov. 3, 2016

Related U.S. Application Data

(60) Provisional application No. 62/155,767, filed on May 1, 2015.

(51) Int. Cl.
  *G06F 17/30* (2006.01)

(52) U.S. Cl.
  CPC .. *G06F 17/30303* (2013.01); *G06F 17/30569* (2013.01); *G06F 17/30864* (2013.01)

(58) Field of Classification Search
  CPC .................. G06F 17/30569; G06F 17/30303
  USPC ......................................................... 707/692
  See application file for complete search history.

(56) References Cited

U.S. PATENT DOCUMENTS

| | | | | |
|---|---|---|---|---|
| 6,574,635 B2 * | 6/2003 | Stauber | ................... | G06F 9/465 707/704 |
| 6,976,039 B2 * | 12/2005 | Chefalas | ............. | G06F 11/1451 707/704 |
| 7,028,079 B2 * | 4/2006 | Mastrianni | ................ | G06F 8/60 707/802 |
| 2004/0249644 A1 | 12/2004 | Schiefer et al. | | |
| 2013/0227573 A1 | 8/2013 | Morsi et al. | | |

FOREIGN PATENT DOCUMENTS

WO    WO 2014/190209 A1    11/2014

OTHER PUBLICATIONS

International Searching Authority (ISA/US), PCT Notification of Transmittal of the International Search Report and the Written Opinion of the International Searching Authority or the Declaration dated Jul. 29, 2016, for Application No. PCT/US2016/30333, Alexandria, VA, 7 pages.

* cited by examiner

*Primary Examiner* — Shahid Alam

(74) *Attorney, Agent, or Firm* — Maschoff Brennan

(57) ABSTRACT

The present disclosure involves a method of ingesting data in an enterprise server environment. A configuration file is accessed. The configuration file specifies a blueprint for constructing a data adaptor that includes a data adaptor source, a data adaptor sink, and a data adaptor channel coupled between the data adaptor source and the data adaptor sink. The data adaptor is constructed based on the configuration file. Via the data adaptor, data is retrieved from a first entity. Also via the data adaptor, the retrieved data is written to a second entity different from the first entity. The accessing, the constructing, the retrieving, and the writing are performed by one or more electronic processors.

20 Claims, 16 Drawing Sheets

CONSTRUCTING A DATA ADAPTOR IN AN ENTERPRISE SERVER DATA INGESTION ENVIRONMENT

CROSS REFERENCE TO RELATED APPLICATION

This application claims priority to Provisional Patent Application No. 62/155,767, filed May 1, 2015, the disclosure of which is hereby incorporated by reference in its entirety.

BACKGROUND

Technical Field

The present disclosure generally relates to data ingestion, and more particularly, to extracting data from a viable data source, passing the data through series of transformations, and streaming it into a viable data store.

Related Art

Apache™ Hadoop® is an open source software framework for distributed data storage and distributed data processing. Large data sets can be distributed on computer clusters built from commodity servers. Hadoop is designed for scalability while having a high degree of fault tolerance, as the modules in Hadoop are designed with an assumption that hardware failures may be common and thus should be automatically detected and handled in software by the framework.

Currently there are various approaches of importing data into Hadoop, for example, Apache Sgoop™, Flume™, Representational State Transfer (REST), and Apache Kafka™ etc. Under these existing approaches, the ingestion and processing of data become "background" processes, which are, for the most part, invisible to the users who depend on them. However, the problem surfaces when Hadoop systems scale out. When enterprises deploy hundreds or thousands (or more) nodes, managing user data and user jobs requires a small army of system administrators with broad and deep knowledge of both Hadoop and Linux. Errors cannot be resolved easily and data governance and life cycle management become ongoing issues. It is almost axiomatic in the industry that background processes, once working, are forgotten—that is until a problem occurs. Then the issue can become "hot" and system administrators have to hunt down the offending process, determine that cause and go through the process of solving the problem and re-running the process/job. This can be lengthy, time consuming and error prone. Issues like this usually occur at critical times—when the system is being used extensively. Basically, by burying data import and MapReduce jobs in the Linux infrastructure, they become invisible—until something breaks. Then it becomes a crisis until it is fixed.

Therefore, while existing methods and systems of ingesting data have been generally adequate for their intended purposes, they have not been entirely satisfactory in every aspect. What is needed is a data ingestion framework is more configuration-driven and offers better control and visibility to its administrators.

DETAILED DESCRIPTION

Figure 1:
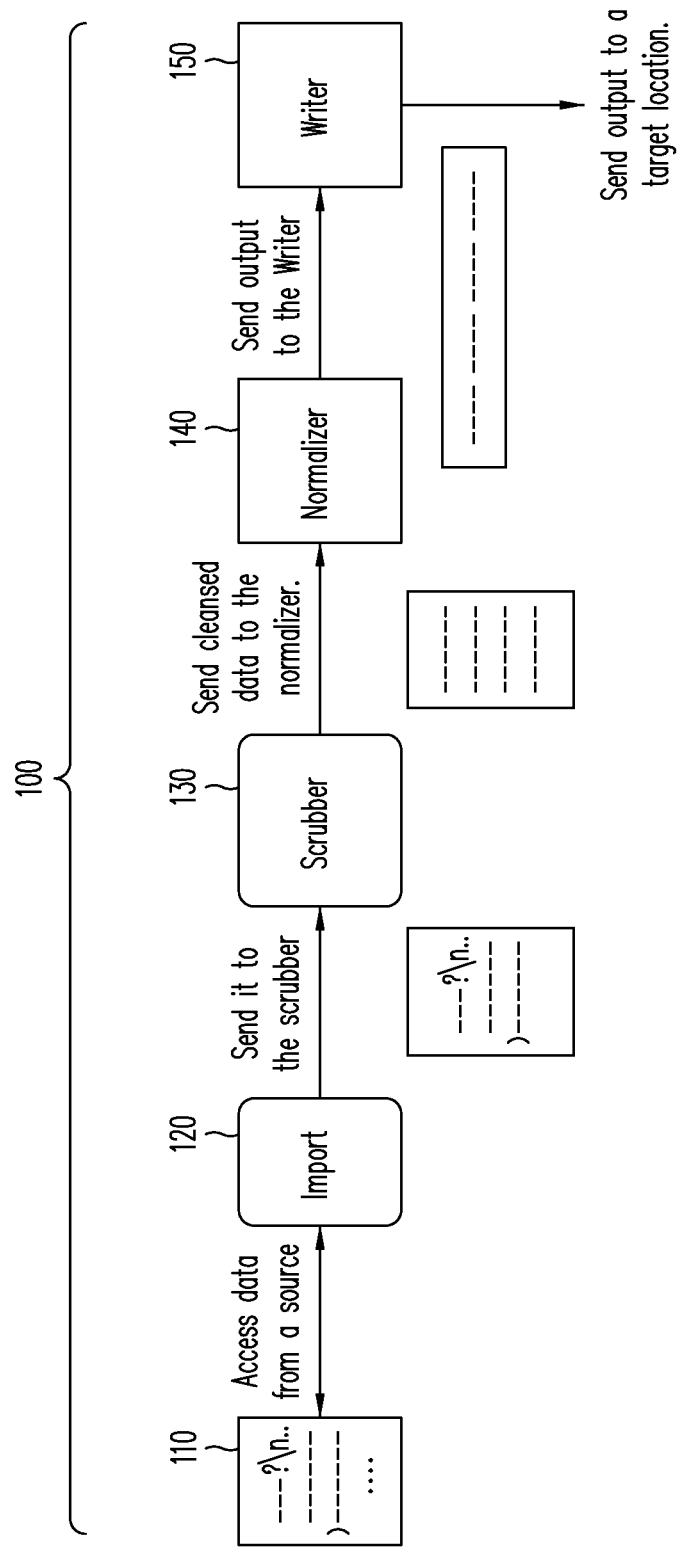
FIG. 1 is a diagram illustrating an example pipeline data ingestion architecture according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

An aspect of the present disclosure is directed to enterprise servers. The enterprise server includes a computer memory storage component configured to store computer programming instructions; and a computer processor component operatively coupled to the computer memory storage component, wherein the computer processor component is configured to execute code to perform the following operations: accessing a configuration file, wherein the configuration file specifies a blueprint for constructing a data adaptor that includes a data adaptor source, a data adaptor sink, and a data adaptor channel coupled between the data adaptor source and the data adaptor sink; constructing the data adaptor based on the configuration file; retrieving, via the data adaptor, data from a first entity; and writing, via the data adaptor, the retrieved data to a second entity different from the first entity.

Another aspect of the present disclosure is directed to a method of ingesting data in an enterprise server environment. The method includes: accessing a configuration file, wherein the configuration file specifies instructions or data, such as a blueprint, for constructing a data adaptor that includes a data adaptor source, a data adaptor sink, and a data adaptor channel coupled between the data adaptor source and the data adaptor sink; constructing the data adaptor based on the configuration file; retrieving, via the data adaptor, data from a first entity; and writing, via the data adaptor, the retrieved data to a second entity different from the first entity; wherein the accessing, the constructing, the retrieving, and the writing are performed by one or more electronic processors.

Yet another aspect of the present disclosure is directed to an apparatus comprising a non-transitory, tangible computer readable storage medium storing a computer program, wherein the computer program contains instructions that when executed, perform the following steps to ingest data in an enterprise server environment: accessing a configuration file, wherein the configuration file specifies instructions or data, such as a blueprint, for constructing a data adaptor that includes a data adaptor source, a data adaptor sink, and a data adaptor channel coupled between the data adaptor source and the data adaptor sink; constructing the data adaptor based on the configuration file; retrieving, via the data adaptor, data from a first entity; and writing, via the data adaptor, the retrieved data to a second entity, wherein the first entity and the second entity are different types of data sources.

A data ingestion framework is disclosed according to the various aspects of the present disclosure. It extends Apache Flume™ and enables users to dynamically build—via a blueprint specified by a configuration file—data adapters that can extract data from any viable data source, pass the data through series of transformations, and stream it into any viable data store. It is pluggable, and users/developers can specify the modules that compose the pipeline, and the data ingestion framework herein will then build that pipeline and manage it for the life span of that data adapter.

Though there are other offerings for loading data into Hadoop™, they have problems associated with data ingestion. The data ingestion framework herein promotes solutions in this space and offers benefits of using the framework for rapidly developing and deploying heterogeneous data adapters that can stream data from one type of data source to another.

Current ways to import data into Hadoop include the following:

Apache Sqoop™, "a tool designed for efficiently transferring bulk data between Hadoop and structured datastores such as relational databases."

Flume, "a distributed, reliable, and available service for efficiently collecting, aggregating, and moving large amounts of log data."

REST (representational state transfer) based methods for data ingestion using WebHDFS (HDFS stands for Hadoop Distributed File System), but this requires developing a service to handle the data ingestion.

Other methodologies that use a combination of services, like Kafka (publish-subscribe messaging rethought as a distributed commit log) and MapReduce or Storm to ingest data into Hadoop.

For the most part, these artifacts are offered to developers as libraries, which can be launched using executable scripts. Scripts are lifecycle managers for these executables. This is a natural progression, since most services in a Linux system (in which Hadoop runs), are usually managed by scripts. This is an established and tenured methodology. Scripts also have the additional benefit of being run from cron—a "time-based job scheduler in Unix-like computer operating systems." Therefore, the scenario that unfolds is System Administrators installing and running data ingestion and data processing jobs using cron. These jobs are maintained and managed by Linux/Unix System administrators for as long as they are required. The implications of this practice, is that the ingestion and processing of data become "background" processes, which are (for the most part) invisible to the users who depend on them.

The problem with the approach discussed above surfaces when Hadoop systems scale out. When enterprise systems—large scale application hardware/software packages that support multiple business processes, information flows, reporting, and data analytics—deploy 4000 or 10,000 or more nodes, managing user data and user jobs may require a small army of system administrators with broad and deep knowledge of both Hadoop and Linux. In that environment, when errors occur, they cannot be resolved easily, and data governance and life cycle management become ongoing issues. As such, background processes are forgotten once they are working—that is, until a problem occurs. The issue then becomes "hot," and system administrators have to hunt down the offending process, determine that cause, and go through the process of solving the problem and re-running the process/job. This can be lengthy, time consuming and error prone. Issues like this usually occur at critical times—when the system is being used extensively. Basically, by burying data import and MapReduce jobs in the Linux infrastructure, they become invisible until something breaks. Then it becomes a crisis until it is fixed.

To address this situation, the present disclosure (e.g., the data ingestion framework) is directed to a data and a job management platform, which uses REST-based services for data ingestion and job scheduling. Data ingestion is performed by a set of entities called data adapters, which offers a platform level solution. These adapters are aware of the data they import: they know where it comes from and where it goes. The data adaptors can also be managed interactively through REST calls. Each data adaptor is an intelligent service that can pull the data in, store the data somewhere, and easily retrieve the status of the data. Since the data adaptors herein are configuration driven, a user can easily tell where the data came from (or where the data went) by querying the data adaptor.

The data adaptor includes three components: a data adaptor source, a data adaptor channel, and a data adaptor sink.

data adaptor source (hereinafter interchangeably referred to as a source): the data adaptor source retrieves data from some data source like a File system, a relational store (RDBMS), a document store (MongoDB) or messaging systems like Kafka. Any viable data provider can be a location from which a source retrieves data.

data adaptor channel (hereinafter interchangeably referred to as a channel): the data adaptor channel is an internal location where the source places the data retrieved from an external data source. A source can write data into multiple channels.

data adaptor sink (hereinafter interchangeably referred to as a sink): the data adaptor sink takes data from a channel and "sinks" it or loads it into a target location. The most ubiquitous use case is that a sink writes into HDFS, but there is no requirement that this is always the case.

However, data ingestion is not simply the act of taking data from one place and moving it to another. This is because each source and destination may have specialized access methodologies, and data in transition usually goes through some transformation before landing at its destination. Thus, one problem that needs to be solved by the present disclosure is how to build a data ingestion framework that can adapt to different sources and destinations as well as the diverse transformations of data as it flows from one location to another. Further details of this problem are provided below:

source data: It is clear that data retrieved from a file system will be structured differently than data from a relational source, and data from a streaming data source would be structured differently than the data from a document store. Consequently, the data adapter cannot make any assumptions about the nature of the data that it finds in the data source. Instead, it must adapt not only to the access methods of the data source, but also to the structure and types of the data it finds in the data source.

data transformation: Additionally, when data finally lands at its destination, it may have a very different structure from its source. After all, the target location may be an entirely different data store having nothing in common with the source of the data. The data adapter herein therefore cannot be opinionated about a target location. It must adapt to the needs of that location, and it must write data in the manner and format required by the target location.

cleansing and filtering: There are some common data operations performed on migrating data. It may need to be scrubbed and cleansed prior to data import; it may need to be restructured; it might need to be repackaged; or certain fields in the data might need to be extracted or encrypted prior to being written out. As such, data cleansing can range from the simple to the complex, depending on the needs of the user.

modularity: Many of the requirements for handling data like cleansing or filtering, for example, may be developed for one adapter but could be re-used for another use case. The initial impulse for solving this issue is to create a library or set of libraries for these common behaviors. However, creating these libraries is not enough. When included into a conventional data adapter, wiring up these libraries into a workable adapter still consumes time, and the construction methodologies become specialized for each adapter. This is less than optimum, and it compromises the adoption of the libraries. As such, the data adaptor needs to be able to be dynamically built by mixing and matching modules contained within a library.

The present disclosure overcomes the problems discussed above by using a pipeline processing pattern and by building or wiring up a data adaptor dynamically via a configuration file. The pipeline processing pattern observes that data in migration "flows through a sequence of tasks or stages" much like an assembly line. Each step in the pipeline performs some action on the data and passes the results of that action to the next step/stage in the pipeline. At the end of the pipeline, the data has gone through some transformation and is then sent/written to its final destination.

FIG. 1 illustrates a simplified example of a pipeline processing system 100. A data source 110 provides data. A data import component 120 imports the data from the data source 110 and sends the imported data to a data scrubber component 130. The data scrubber component 130 cleanses the data and sends the cleansed data to a data normalizer component 140. The data normalizer component 140 normalizes the data received from the data scrubber component 130 and sends it to a data writer 150. The data writer 150 sends the output (i.e., the normalized and cleansed data) to a target location.

In the context of a data adapter, the pipeline-processing pattern is applied to two components—the data adaptor source and the data adaptor sink:

The source uses a pipeline to import data, and in some embodiments it performs some minor data transformation and sends it to a channel processor/selector. The channel selector directs the flow of traffic into various channels based on selection criteria.

A sink is associated with a single channel. It is possible to have one or more sinks associated with a channel, but this is not a common use case. After a sink gets data from a channel, it sends it through its pipeline which performs additional processing on the data, at the end of the pipeline, data is written to any viable data source—HDFS, HBase, Solr, MySQL, etc.

Figure 2:
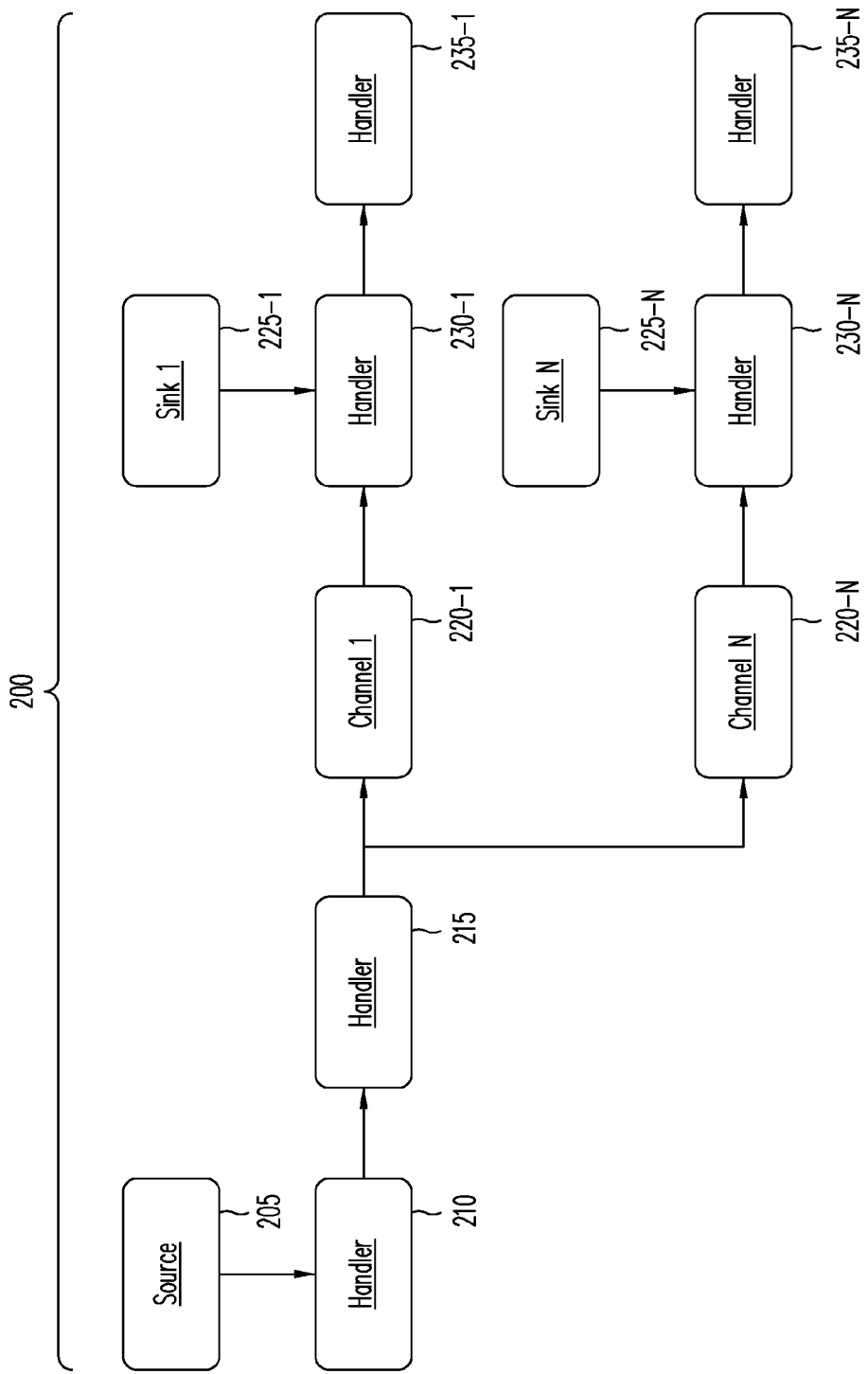
FIG. 2 is a diagram illustrating an example scalable data ingestion framework according to various aspects of the present disclosure.

The following sections describe how these patterns are used within the data ingestion framework herein. FIG. 2 illustrates a simplified diagrammatic view of a pipelined framework 200 according to an embodiment. Each step in the pipeline corresponds to an interface—called a handler. Various implementations can be plugged into a handler. A source 205 (e.g., the data adaptor source is a managing entity over a set of handlers, for example handlers 210 and 215. The source 205 starts up a data handler chain that includes the handlers 210 and 215. The first handler 210 in the chain imports data from a data-containing entity, such as a suitable file system. The second handler 215 in the chain is a channel selector, which writes the data to one or more channels 220-1 to 220-N. Each of the channels 220-1 to 220-N here corresponds to its own sink, for example sink 225-1 for channel 220-1, and sink 225-N for channel 220-N. sinks 225-1 and 225-N (i.e., the data adaptor sinks) are also each managing a respective set of data handlers, for example handlers 230-1 and 235-1 for sink 225-1, and handlers 230-N and 235-N for sink 225-N. The handlers 230-1 and 230-N filter out unwanted data, or they scrub or restructure the data. The handlers 235-1 and 235-N then write the data that has been filtered/scrubbed/restructured to their respective destinations, which may be an entity such as a HDFS, Apache HBase™, etc. It is understood that the entity from which data is retrieved by the source 205 may be a different type of entity than the one to which data is written by the sinks 225-1 or 225-N (via their respective handlers 235-1 or 235-N). It is also understood that the framework 200 may also be viewed as a data adaptor according to an embodiment the present disclosure, which will be discussed in more detail below.

FIG. 2 illustrates a scalable pattern: a single source (i.e., source 205 and its associated handlers 210/215) writing to multiple channels (i.e., channels 220-1 to 220-N). However, it is understood that the data ingestion framework herein allows the user to configure the sources and channels in many ways: one to one, one to many, or multiple combination of the two. In addition, FIG. 2 illustrates an embodiment of the data ingestion framework herein where there is a single sink (i.e., sink 225-1 or 225-N) associated with a channel (i.e., channels 220-1 or 220-N), because this approach optimizes throughput. However, it is understood that multiple sinks reading from a single channel is also allowed by the data ingestion framework. In that case, the user needs to ensure that each "read" from a channel is within the context of an atomic transaction. That will ensure data integrity and prevent race conditions from taking place.

Figure 3:
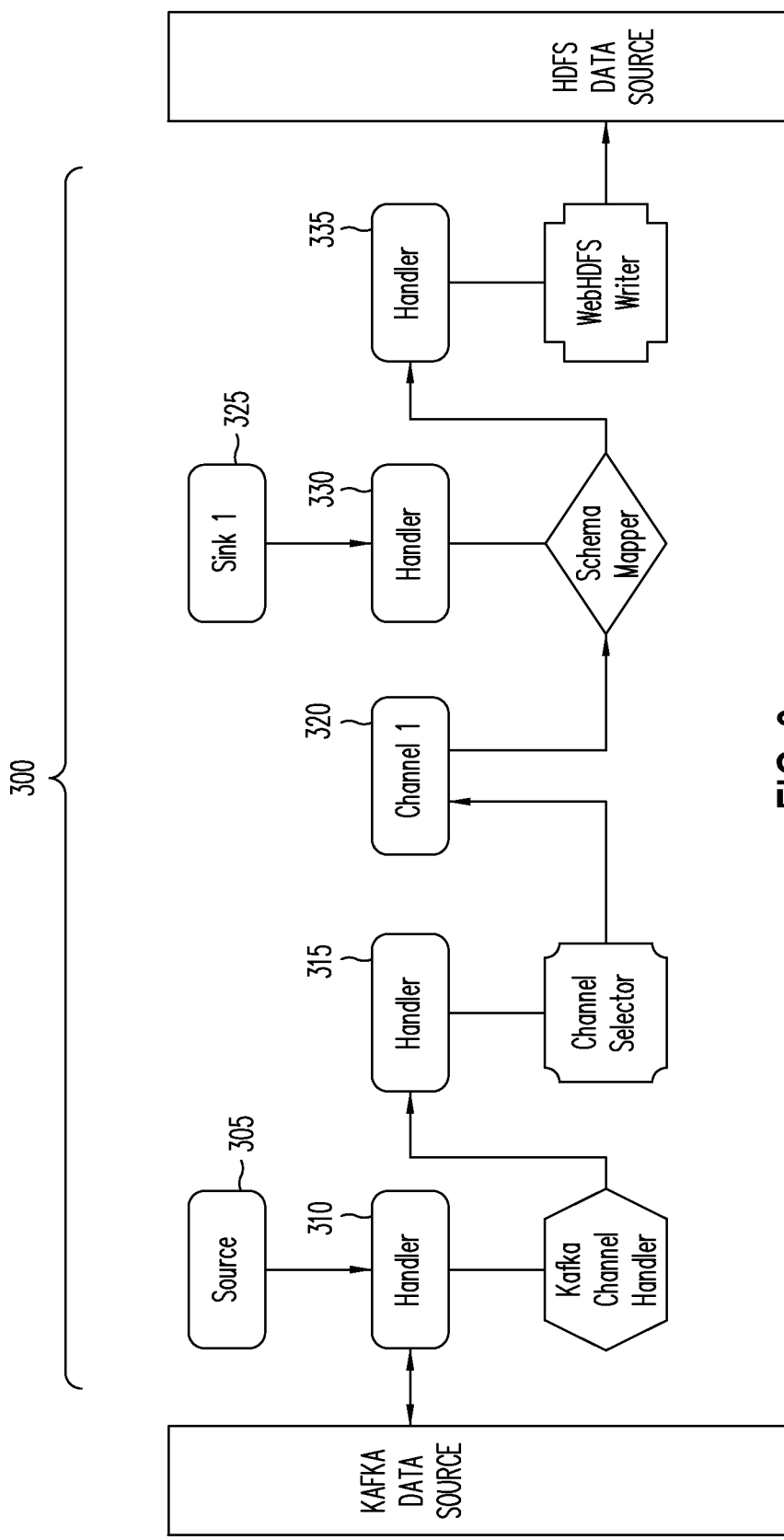
FIG. 3 is a diagram illustrating an example data adaptor according to various aspects of the present disclosure.

Based on the model shown in FIG. 2, various processing units can be plugged into the pipeline so that data can pass through the pipeline and be cleansed, re-structured, re-formatted and delivered to its final destination. FIG. 3 illustrates an example of how this would take place. The example is based on a data adapter 300, which imports data from an entity such as a Kafka data source and streams it into another entity such as a HDFS data source. In more detail, the data adaptor 300 includes a source 305 (i.e., the data adaptor source), handlers 310 and 315 associated with the source 305, a sink 325 (i.e., the data adaptor sink), handlers 330 and 335 associated with the sink 325, and a channel 320 (i.e., the data adaptor channel) coupled between the source 305 and the sink 325. The source 305 manages the handler 310 (which is a Kafka channel handler) to import data from the Kafka data source. The handler 315 is a channel selector that sends the imported data to the channel 320. The sink 325 manages the handler 330 to receive the data from the channel 320. The handler 330 includes a SchemaMapper, which transforms the incoming data and sends it to the next handler 335, which includes a WebHDFS writer. The handler 335 writes the data to the HDFS data source.

In various embodiments, the originating data sources and the destination data sources may each include, but are not limited to, HDFS, Hive, HBase, Files, RDBMS, document stores, or streaming data (Kafka). The entity corresponding to the originating data source may also be a different type of data entity than the data entity corresponding to the destination data source.

One of the issues with developing a data adapter is how to construct it. If a user/developer must write a large amount of boilerplate code that builds and maintains an adapter, then the very purpose of the framework would be compromised. Consequently, the data ingestion framework herein uses a builder pattern to construct and dynamically wire up a data adapter. Leveraging this pattern, the data ingestion framework herein uses a set of builders that construct, wire-up and manage a data adapter. These factories get their blueprints from an external configuration file, written in JavaScript Object Notation (JSON). Using this configuration file, which specifies the type of each handler, its properties and its order in the pipeline, the framework builds the handlers and wires them up as a part of the construction process for the data adaptor.

Figure 4:
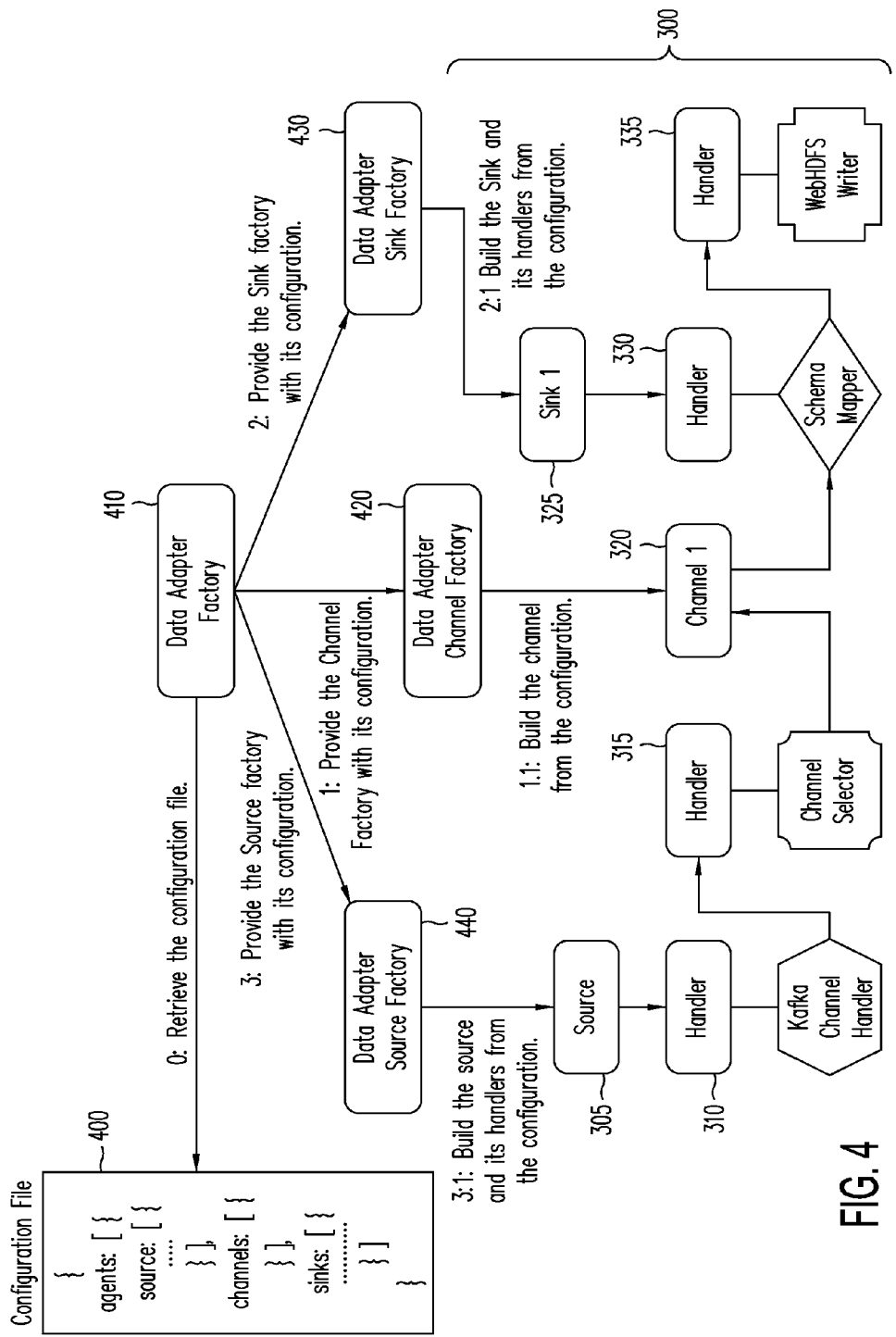
FIG. 4 illustrates a simplified diagram showing how a configuration/descriptor file is used to build an instance of a data adaptor according to various aspects of the present disclosure.

FIG. 4 illustrates how a configuration/descriptor file is used to build an instance of a data adapter (for example the data adaptor 300 shown in FIG. 3 and discussed above) according to an embodiment of the present disclosure. A configuration file 400 is provided. In some embodiments, the configuration file 400 is written in JSON. The configuration file 400 serves as a blueprint for how to build the data adaptor 300 and species the type of each of the handlers (e.g., handlers 310, 315, 330, 335), their properties, and their order in the pipeline. The code for an example configuration file is included below.

```
{
    "agents" : [{
        "name" : "kafka-data-adapter",
        "source" : [{
            "name": "tracking-api-source",
            "type": "kafka-cluster-source",
            "data-handlers": [{
                "name": "tracking-api-kafka-consumer",
                "type": "kafka-consumer",
                "processor":
"org.ebaysf.trystyll.data.adapter.test.mock.data.handler.MockKafkadatachannelProcessor",
                "brokerList": ["kafka.provider.three:9094"],
                "host": "kafka.provider.three",
                "port": "9094",
                "consumerId" : "tracking-api-consumer-one",
                "topic" : "tracking-api-test-topic",
                "partition" : "0"
            }, {
                "name": "kafka-channel-selector-proxy-1",
                "type": "channel-selector-proxy",
                "processor":
"org.ebaysf.trystyll.data.adapter.test.mock.data.handler.MockKDAsourcedataProcessor",
                "selectorClazz" :
"org.ebaysf.trystyll.data.adapter.test.mock.data.handler.MockKDAchannelSelector"
            }]
        }],
        "channels": [{
            "name" : "c1",
            "type" : "kafka-channel",
            "channelClazz" :
"org.ebaysf.trystyll.data.adapter.test.mock.data.handler.MockKDAchannel",
            "dataDirs" : "./src/test/resources/kafka/kafka.log",
            "brokerList" : "kafka.provider.one:9092",
            "kafkaHost" : "127.0.0.1",
            "kafkaPort" : "9092",
            "topic" : "test-1",
            "partition" : "0",
            "requiredAcks" : "1",
```

```
                "serializerClass" : "kafka.serializer.StringEncoder",
                "partitionerClass" :
"org.ebaysf.trystyll.data.adapter.kafka.integration.test.SimplePartitioner"
            }, {
                "name" : "c2",
                "type" : "kafka-channel",
                "channelClazz" :
"org.ebaysf.trystyll.data.adapter.test.mock.data.handler.MockKDAchannel",
                "dataDirs" : "./src/test/resources/kafka/kafka.log",
                "brokerList" : "kafka.provider.one:9092",
                "kafkaHost" : "127.0.0.1",
                "kafkaPort" : "9092",
                "topic" : "test-1",
                "partition" : "1",
                "requiredAcks" : "1",
                "serializerClass" : "kafka.serializer.StringEncoder",
                "partitionerClass" : "org.trystyll.data.adapter.kafka.integration.test.
SimplePartitioner"
            }, {
                "name" : "c3",
                "type" : "kafka-channel",
                "channelClazz" :
"org.ebaysf.trystyll.data.adapter.test.mock.data.handler.MockKDAchannel",
                "dataDirs" : "./src/test/resources/kafka/kafka.log",
                "brokerList" : "kafka.provider.one:9092",
                "kafkaHost" : "127.0.0.1",
                "kafkaPort" : "9092",
                "topic" : "test-1",
                "partition" : "2",
                "requiredAcks" : "1",
                "serializerClass" : "kafka.serializer.StringEncoder",
                "partitionerClass" :
"org.ebaysf.trystyll.data.adapter.kafka.integration.test.SimplePartitioner"
            }, {
                "name" : "c4",
                "type" : "kafka-channel",
                "channelClazz" :
"org.ebaysf.trystyll.data.adapter.test.mock.data.handler.MockKDAchannel",
                "dataDirs" : "./src/test/resources/kafka/kafka.log",
                "brokerList" : "kafka.provider.one:9092",
                "kafkaHost" : "127.0.0.1",
                "kafkaPort" : "9092",
                "topic" : "test-1",
                "partition" : "3",
                "requiredAcks" : "1",
                "serializerClass" : "kafka.serializer.StringEncoder",
                "partitionerClass" :
"com.stubhub.data.adapter.kafka.integration.test.SimplePartitioner"
            }, {
                "name" : "c5",
                "type" : "kafka-channel",
                "channelClazz" :
"org.ebaysf.trystyll.data.adapter.test.mock.data.handler.MockKDAchannel",
                "dataDirs" : "./src/test/resources/kafka/kafka.log",
                "brokerList" : "kafka.provider.one:9092",
                "kafkaHost" : "127.0.0.1",
                "kafkaPort" : "9092",
                "topic" : "test-1",
                "partition" : "4",
                "requiredAcks" : "1",
                "serializerClass" : "kafka.serializer.StringEncoder",
                "partitionerClass" :
"corn.stubhub.data.adapter.kafka.integration.test.SimplePartitioner"
            }],
            "selector": {
                "type": "round-robin",
                "name": "source-channel-selector",
                "header": "tracking-api-selector",
                "selectorClazz" :
"org.trystyll.data.adapter.test.mock.data.handler.MockKDAchannelSelector",
                "mapping": {
                    "topic-partition-one" : "test1:0",
                    "topic-partition-two" :"test1:1",
                    "topic-partition-three" : "test1:2",
                    "topic-partition-four" : "test1:3",
                    "topic-partition-five" : "test1:4"
                }
            },
            "sinks" : [{
                "name": "s1",
```

```
        "channel": "test-1:0",
        "data-processors": [{
          "name": "webhdfs-processor-1",
          "type": "webhdfs-processor",
          "processor":
"org.ebaysf.trystyll.data.adapter.test.mock.data.handler.MockWebHdfsdataProcessor",
          "batchSize": "1",
          "hostName" : "vagrant-centos65.vagrantup.com",
          "port" : "50070",
          "hdfsPath" : "/webhdfs/v1/data/tracking/raw/001",
          "hdfsUser" : "hdfs",
          "hdfsOverwrite" : "true",
          "hdfsPermissions" : "777"
        }]
      }, {
        "name": "s2",
        "channel": "test-1:1",
        "data-processors": [{
          "name": "webhdfs-processor-2",
          "type": "webhdfs-processor",
          "processor":
"org.ebaysf.trystyll.data.adapter.test.mock.data.handler.MockWebHdfsdataProcessor",
          "batchSize": "1",
          "hostName" : "sandbox.hortonworks.com",
          "port" : "50070",
          "hostName" : "vagrant-centos65.vagrantup.com",
          "hdfsPath" : "/webhdfs/v1/data/tracking/raw/002",
          "hdfsUser" : "hdfs",
          "hdfsOverwrite" : "true",
          "hdfsPermissions" : "777"
        }]
      }, {
        "name": "s3",
        "channel": "test-1:2",
        "data-processors": [{
          "name": "webhdfs-processor-3",
          "type": "webhdfs-processor",
          "processor":
"org.ebaysf.trystyll.data.adapter.test.mock.data.handler.MockWebHdfsdataProcessor",
          "batchSize": "1",
          "hostName" : "vagrant-centos65.vagrantup.com",
          "port" : "50070",
          "hdfsPath" : "/webhdfs/v1/data/tracking/raw/003",
          "hdfsUser" : "hdfs",
          "hdfsOverwrite" : "true",
          "hdfsPermissions" : "777"
        }]
      }, {
        "name": "s4",
        "channel": "test-1:3",
        "data-processors": [{
          "name": "webhdfs-processor-4",
          "type": "webhdfs-processor",
          "processor":
"org.ebaysf.trystyll.data.adapter.test.mock.data.handler.MockWebHdfsdataProcessor",
          "batchSize": "1",
          "hostName" : "vagrant-centos65.vagrantup.com",
          "port" : "50070",
          "hdfsPath" : "/webhdfs/v1/data/tracking/raw/004",
          "hdfsUser" : "hdfs",
          "hdfsOverwrite" : "true",
          "hdfsPermissions" : "777"
        }]
      }, {
        "name": "s5",
        "channel": "test-1:4",
        "data-processors": [{
          "name": "webhdfs-processor-5",
          "type": "webhdfs-processor",
          "processor":
"org.ebaysf.trystyll.data.adapter.test.mock.data.handler.MockWebHdfsdataProcessor",
          "batchSize": "1",
          "hostName" : "vagrant-centos65.vagrantup.com",
          "port" : "50070",
```

-continued

```
            "hdfsPath" : "/webhdfs/v1/data/tracking/raw/005",
            "hdfsUser" : "hdfs",
            "hdfsOverwrite" : "true",
            "hdfsPermissions" : "777"
        }]
    }]
  }]
}
```

A data adaptor factory 410 accesses the configuration file 400, which as discussed above contains the blueprint or specification for building, maintaining, and running the various components of the data adaptor 300. Based on the contents of the configuration file 400, the data adaptor factory 410 provides a data adaptor channel factory 420 with its configuration, provides a data adaptor sink factory 430 with is configuration, and provides a data adaptor source factory 440 with its configuration. With the provided configurations specified by the configuration file 400, the data adaptor channel factory 420 builds the channel 320, the data adaptor sink factory 430 builds the sink 325 and its corresponding handlers 330 and 335, and the data adaptor source factory 440 builds the source 305 and its corresponding handlers 310 and 315.

The programming code for configuring the various components of an embodiment of the data adaptor is provided below along with the relevant descriptions to further illustrate how the data adaptor is built and wired up. In this example below, the data adaptor is built to retrieve data from a Kafka data source and to write data to a HDFS data destination.

First, the programming code for configuring a data adaptor channel is provided in table 1 below. The column on the left hand side of Table 1 contains the actual code, while the column on the right hand side of Table 1 contains the descriptions for the code.

Figure 5:
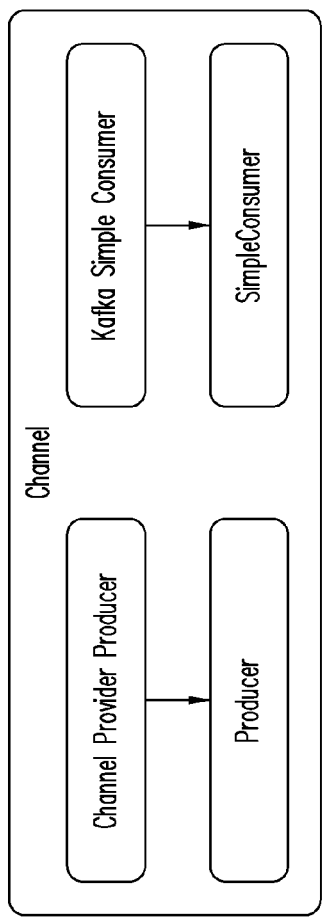
FIG. 5 illustrates a diagram of a data adaptor channel constructed via the configuration/descriptor file according to various aspects of the present disclosure.

With reference to Table 1, each channel will have a similar configuration, and the data adaptor channel factory (also referred to as a channel builder) will use this configuration/specification to construct a data adaptor channel shown in FIG. 5. Among other things, the data ingestion framework herein uses the fully qualified class name "com.stubhub.meritage.channel.Kafkachannel" to build and wire up the channel. The data adaptor channel contains wrappers for Kafka's Producer and SimpleConsumer. These wrappers—"channel Provider Producer" and "Kafka Simple Consumer" integrate and manage the life cycle of Kafka's Producer and SimpleConsumer. A producer herein is defined as an entity in the channel that writes to Kafka, and a consumer herein is defined as an entity that reads from Kafka.

Next, the programming code for configuring a data adaptor sink is provided in table 2 below. The column on the left hand side of Table 2 contains the actual code, while the column on the right hand side of Table 2 contains the descriptions for the code.

TABLE 1

| | Configuration | Description |
| --- | --- | --- |
| "channels": [{ | | |
|     "name" | : "tracking-data-client-0", | The name of the channel |
|     "type" | : "kafka-channel", | The type of the channel |
|     "channelClazz" | : "com.stubhub.meritage.channel.KafkaChannel", | The Java class which implements the channel. |
|     "offsetDataDir" | : "./src/test/resources/data/consumer", | This is the location of the readOffset which tells the channel where to start reading from. |
|     "dataDirs" | : "./src/test/resources/kafka/kafka.log", | A log directory. |
|     "brokers" | : "kafka.provider.one:9092,kafka.provider.two:9096", | This tells the KafkaChannel's producers and consumers, the VIPS of the Kafka Brokers. |
|     "kafkaHost" | : "127.0.0.1", | This parameter is deprecated. It should be removed. Ignore it. |
|     "kafkaPort" | : "9092", | This parameter is deprecated. It should be removed. Ignore it. |
|     "topic" | : "tracking-data", | This is the topic of the channel. In Trystyll's world a Channel is a single topic and partition. |
|     "partition" | : "0", | The channels partition. |
|     "messageSize" | : "1000000", | The max size of a message that can be written to or read from a partition. |
|     "requiredAcks" | : "1", | The number of Acknowledgments required from Kafka when a message is written. |
|     "serializerClass" | : "kafka.serializer.StringEncoder", | The class used to encode strings. |
|     "partitionerClass" | : "com.stubhub.meritage.channel.SimplePartitioner" | The partitioner used to interpret the key and to distribute messages over the number of partitions for a topic. |
|   }, | | |

TABLE 2

| Configuration | Description |
| --- | --- |
| "sinks" : [{ | The container for all data adapter Sinks. |
|     "name"  : "sink-0", | The name of the Sink |
|     "channel" : "tracking-data:0", | The channel from which this Sink will consume data. Currently there is one Sink processing chain per channel. |
|     "data-processors": [{ | |
|         "name"                      : "webhdfs-processor-0", | The name of the processor / handler |
| "type"                              : "webhdfs-processor", | The type of the processor / handler |
|   "processor"                : <br>"com.stubhub.data.adapter.data.processor.WebHdfsDataProcessor", | The data processors / handlers for this Sink. Handler are wired up in the order defined by the configuration. |
|       "batchSize"           : "1", | The batch size for writing to HDFS. |
|       "hostNames"           : <br>"srwp20hen201.stubprod.com,srwp20hen202.stubprod.com", | The hostnames used for the httpFS server which WebHDFS uses to write to and read from HDFS. |
|         "port"              : "14000", | The port for the httpFS server. In HA mode the port is 14000; otherwise it is 50070. |
|         "hdfsFileName"     : "hit_data_0001.txt", | The File on HDFS to write / append data to. |
|         "hdfsPath"          : "/webhdfs/v1/data/tracking/raw/$(account)/$(date)", | The target directory. The account and date fields are filled by the Handler based on the type of data and its date. |
|         "hdfsUser"          : "hdfs", | The user who owns. Note: this is an example only. The user should be defined by data access privileges. |
|     "hdfsOverwrite"        : "true", | In case data needs to be overwritten, this parameter can be set to true. |
|         "hdfsPermissions" : "755" | The permissions on the file. It is configurable based on data access policy |
|     }] | |
|   }, | |
|   ...... | |
| }] | |

Figure 6:
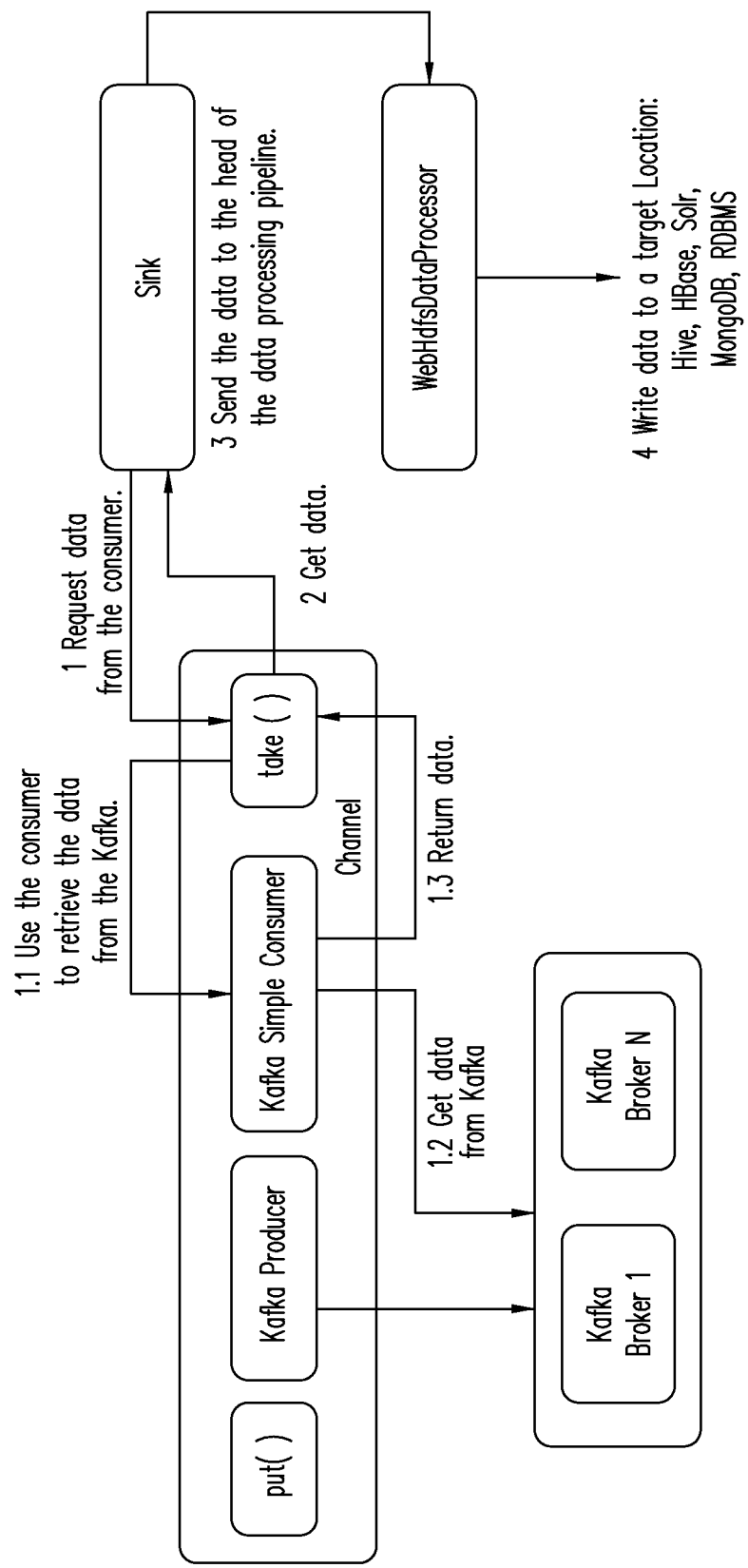
FIG. 6 illustrates a diagram of a data adaptor channel and data adaptor sink constructed via the configuration/descriptor file according to various aspects of the present disclosure.

With reference to Table 2, note that there can be any number of sinks. However, each sink is associated with one channel. When the data adaptor sink factory 430 receives this configuration/specification, it builds the processing pipeline shown in FIG. 6. Among other things, the data ingestion framework herein uses the fully qualified class name "com.stubhub.data.adapter.data.processor.WebHdfsdataProcessor" to build and wire up the sink (which, in this case, writes to HDFS). As FIG. 6 illustrates, in step 1, the sink requests data from the consumer. In step 1.1, the channel uses the Kafka Simple Consumer to retrieve the data from Kafka, and in step 1.2, the Kafka Simple Consumer gets the data from the Kafka Brokers. In step 1.3, the data is returned to the channel. In step 2, the sink gets the data from the channel. In step 3, the sink sends the data to the head of the data processing pipeline (WebHdfsdataProcessor). In step 4, WebHdfsdataProcessor writes data to a target location, which may include Hive, HBase, Solr, MongoDB, or RDBMS. In this manner, a portion of the data adaptor is built/wired.

The programming code for configuring a data adaptor source is provided in table 3 below. The column on the left hand side of Table 3 contains the actual code, while the column on the right hand side of Table 3 contains the descriptions for the code.

TABLE 3

| Code | Description |
| --- | --- |
| "source" : [{ | The declaration for a source. |
|   "name" : "tracking-api-source", | The name of the source. |
|   "type" : "concurrent", | Source type: concurrent means it is runings in a thread; on-demand means it does not. |
|   "data-handlers": [{ | The data handlers: All handlers are wired up in the order defined. |
|     "name"            : "tracking-api-events-client-0", | The name of the Handler |
|     "type"             : "kafka-consumer", | The type of the Handler. |
|     "processor"     : <br>"com.stubhub.data.adapter.data.processor.KafkaDataChannelProcessor", | The Handler itself. |
|     "offsetDataDir"   : "/src/test/resources/data/consumer", | The location there the handler will store its offsets. |
|     "brokers"        : "kafka.provider.one:9092,kafka.provider.two:9096", | The Kafka Brokers from which data is being retrieved. |
|     "host"             : "127.0.0.1", | Deprecated. |
|     "port"             : "9094", | Deprecated |
|     "consumerId"     : "tracking-api-events-client", | The identity of the consumer retrieving the data from the brokers. |
|     "topic"             : "tracking_events", | The topic from which data from which this handler retrieves data. |
|     "partition"      : "0" | The partition from which this handler retrieves data. |
|   }, { | |
|     "name"            : "kafka-channel-selector-proxy-1", | The name of the second handler in the pipeline. |
|     "type"             : "channel-selector-proxy", | The type of the second handler in the pipeline. |
|     "processor"     : <br>"com.stubhub.meritage.handlers.KDASourceDataProcessor", | The Channel Processor: this wraps a channel selector and contains interceptors for further data transformation. |
|     "selector": { | The channel selector which writes to one or more channels. |
|       "type"        : "round-robin", | The type of the selector: a round robin selector writes to channels sequentially in a round-robin fashion. |
|       "processor"   : <br>"com.stubhub.meritage.handlers.KDAChannelSelector", | The channel selector. |

TABLE 3-continued

```
        "header"        : "tracking-api",                    The header put onto the message.
        "mapping"       : [{                                 The mapping between data categories / segments and the channels
                                                             this data is written to.
                                                             The mapping between segment name and the channels associated
                                                             with it.
              "segmentName" : "tracking_events:0",           The segment name, or segment identifier
              "channels"    : ["tracking-data:0","tracking-data:1",   The channels associated with a segment. All data with a segment
                              "tracking-data:2","tracking-data:3",     name of tracking_events:0 will be written, in a
                              "tracking-data:4"]                       round-robin fashion to channels tracking-data:0 - tracking-data:4.
        }]
    }
}]
},
```

Figure 7:
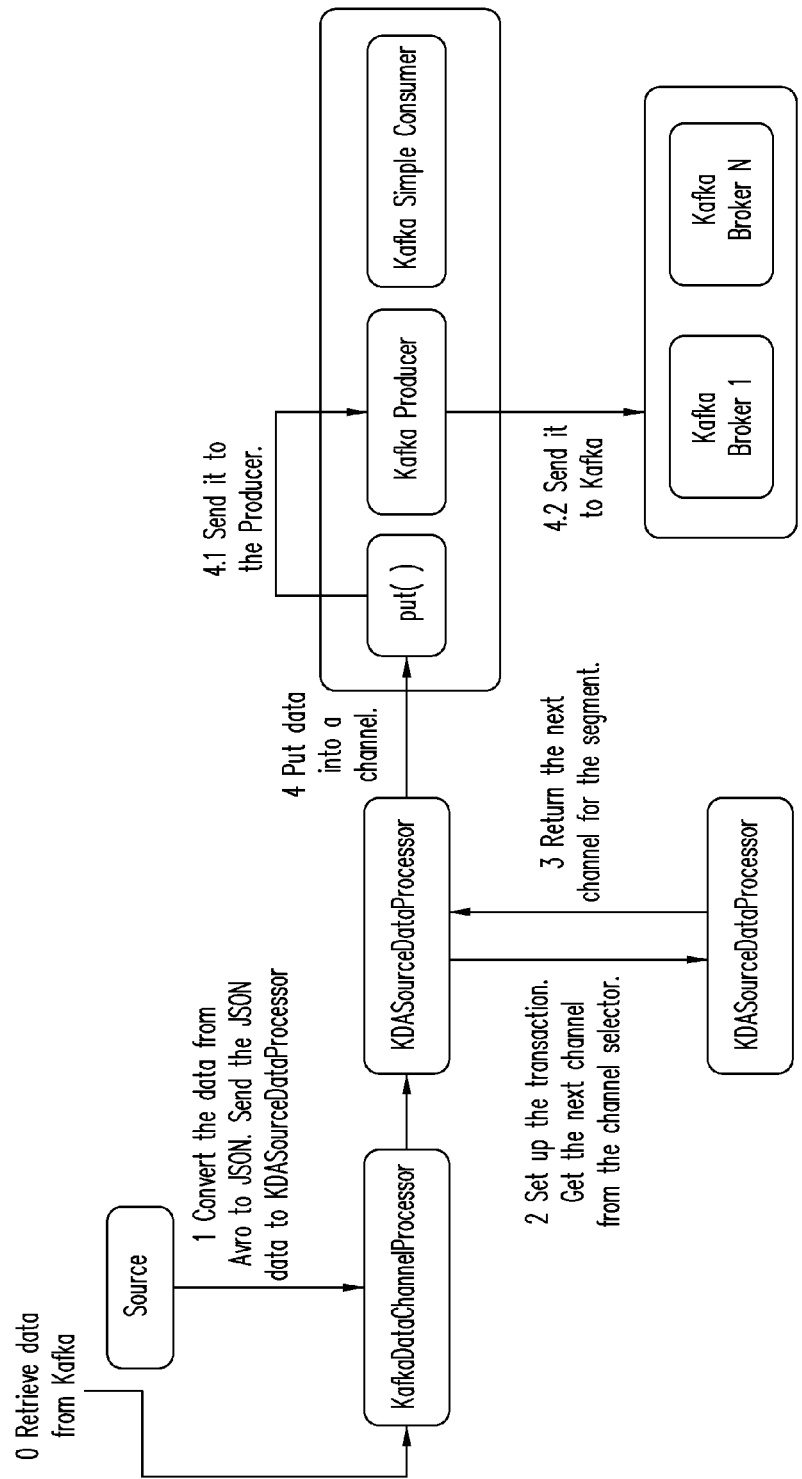
FIG. 7 illustrates a diagram of a data adaptor channel and data adaptor source constructed via the configuration/descriptor file according to various aspects of the present disclosure.

With reference to Table 3, the source herein is defined to include two processors/handlers—KafkadatachannelProcessor and KDAsourcedataProcessor. KafkadatachannelProcessor (where KDA stands for Kafka data adaptor) is used to retrieve data from Kafka, while KDAsourcedataProcessor is used to write data to one or more channels. When the data adaptor source factory 440 receives this configuration/specification, it builds the processing pipeline shown in FIG. 7. Among other things, the data ingestion framework herein uses the fully qualified class name "com.stubhub.data.adapter.data.processor.KafkadatachannelProcessor" to build and wire up the source. As FIG. 7 illustrates, in step 0, data is retrieved from Kafka by the KafkadatachannelProcessor. In step 1, the source converts data from an Apache Avro™ format to a JSON format. The JSON data is then sent to the KDAsourcedataProcessor. In step 2, the KDAsourcedataProcessor sets up the transaction and gets the next channel from the channel selector, and in step 3, the KDAsourcedataProcessor returns the next channel for the segment. In step 4, the KDAsourcedataProcessor puts data into a channel. In step 4.1, the channel sends the data to a Kafka producer, and in step 4.2, the Kafka producer sends the data to one of the Kafka brokers.

Figure 8:
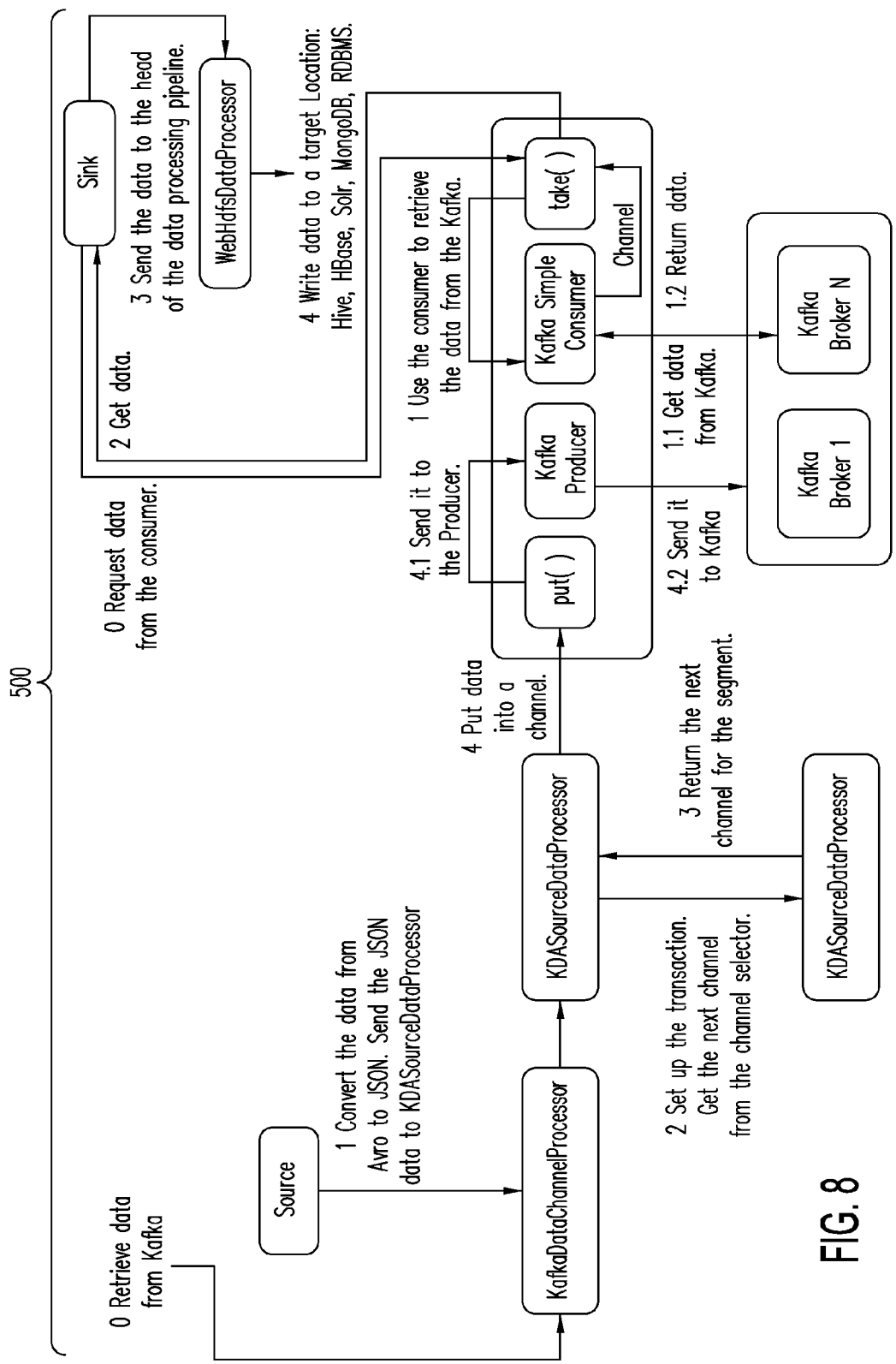
FIG. 8 illustrates a diagram of the entire data adaptor constructed via the configuration/descriptor file according to various aspects of the present disclosure.

When all the individual factories have finished building their respective components, a data adaptor 500 is created, as shown in FIG. 8.

Again, Tables 1-3 above illustrate the programming code from a configuration file that has been broken up (for easier readability and understanding). In the actual execution environment, the data ingestion framework herein may need to access a properties file first to find (among other things) the name of the correct configuration file. For example, in the development environment, the data ingestion framework herein will look at application-dev.properties and find flume-agent-dev-configuration.json as the configuration file. In the test or QA environment, the data ingestion framework herein will look at application-test.properties and find flume-agent-test-configurationjson as the configuration file. In the production environment, the data ingestion framework herein will look at application-prod.properties and find flume-agent-prod-configurationjson as the configuration file. Again, it is the flume-agent-{env}-configurationjson (where "env" can be "dev", "test", or "prod") that contains the specification for building and running the data adapter.

The programming code for an example configuration file is also provided below.

```
# ******************************************
# Base path
# ******************************************
base.path=/nas/bigdata/kafka <--------------------------------------------------
A shared, high volume directory for the Kafka logs
kda.application.context=kda-app-context <---------------------- The context for the application
# ******************************************
# Zookeeper data directories
# ******************************************
zookeeper.host=127.0.0.1 <---------------------- The context for zookeeper running locally. Reconfigure as appropriate
for a
distributed application.
zookeeper.port=2182 <---------------------- The zookeeper port.
zookeeper.log.directory=${base.path}/zkdata-log
zookeeper.data.directory=${zookeeper.log.directory}/data
zookeeper.kafka.root_node=kafka
# ******************************************
# KAFKA PROPERTIES
# ******************************************
kafka.host=127.0.0.1
kafka.port=9092
kafka.log.dirs=${base.path}/embedded-kafka <---------------------- The base directory for the Kafka logs
kafka.brokers=kafka.provider.one:9092,kafka.provider.two:9096 <---------------------- The Kafka brokers.
If local these entries must
be in /etc/hosts
kafka.auto.leader.rebalance.enable=true <---------------------- Rebalance the Kafka brokers based on Leader election.
kafka.default.replication.factor=2 <---------------------- Since there are only two brokers all topics and partitions
are replicated twice.
kafka.log.retention.hours=72 <---------------------- Rotate the Kafka logs after 3 days.
kafka.num.partitions=20 <---------------------- Rotate the Kafka logs after 3 days.
kafka.message.max.bytes=5000000 <---------------------- Max message bytes. It should always be less than
kafka.replica.fetch.max
```

```
.bytes by at least 800K - 900K.
kafka.replica.fetch.max.bytes=10485760 <---------------------- This parameter works with the kafka.message.max.bytes.
# ******************************************
# CONFIGURATION FILES
# ******************************************
descriptor.file-flume-agent-prod-configuration.json <---------------------- The configuration / specification for
the data adapter.
tracking.api.events.avro.schema.file=tracking-api-event-schema-avsc <---------------------- The tracking api
event schema file
tracking-events-hive-schema=tracking-events-hive-schema-V-1.0.1.json
tracking.event.hive.schema.map.V-1.1.0=tracking-event-hive-schema-map-V-1.1.0.json <----------------------
The tracking event to
Hive schema specifications
tracking.events.hive.schema=$(tracking.event.hive.schema.map.V-1.1.0)
# ******************************************
# TRACKING API MESSAGE FILE
# ******************************************
tracking-api-message.file=tracking-api-message.json <
tracking-api-message.v1.0.0.file=tracking-api-message-v-1.0.0.json
# ==============================================================
# HIVE CLIENT parameters:
# ==============================================================
hive.datastore.test.host = srwp20hen202.stubprod.com
hive.master.node = srwp20hen202.stubprod.com
hive.metastore.host = srwp20hen202.stubprod.com
hive.metastore.port = 9083
hive.datastore.test.port = 10000
hive.datastore.data.directory = /gaia/hive/data
hive.datastore.db.name = testhivedriverdb
hive.datastore.table.name = testhivedrivertable
hive.datastore.json.table.name = testJsonTable
hive.datastore.partition.table.name = testpartitiontable
#hive.jdbc.driver = org.apache.hive.jdbc.HiveDriver
hive.test.data.directory = /nas/bigdata/kafka
hive.test.data.file = test_table_data.csv
hive.driver = org.apache.hive.jdbc.HiveDriver
hive.metastore.local = false
hive.support.concurrency.varname = false
hive.source.partition.data.file=test-alpha-user.txt
hive.target.partition.data.file=test-alpha-user.csv
hive.metastore.socketTimeOut=60
hive.metastore.execute.setugi = false
# Webhdfs parameters
webhdfs.port = 14000
webhdfs.uri.base=/webhdfs/v1
# Metastore configuration parameters
hive.metastore.retries = 3
hive.metastore.thrift.scheme = thrift://
hive.uri.jdbc.scheme = jdbc:hive2://
hive.uri.hdfs.scheme = hdfs://
# HCatalog properties
hcat.test.database.name=alphauserdb
hcat.test.table.name=alphausertable
hcat.test.partition.name=dt
hcat.test.partition.type=string
hcat.test.partition.value=20131121
hive.client.sql.directory=/src/main/resources/sql
hive.client.sql.file.drop.table=drop-table.sql
hive.client.partition.sql.directory=/src/main/resources/sql
hive.partition.sql.file.drop.partition=alter-table-drop-partition.sql
# HDP 2.0 Name Node Discovery
hadoop.ha.enabled = true
hadoop.ha.service.name = srwp20nnscl1
hadoop.ha.namenode.1 = srwp20hnn201.stubprod.com8020
hadoop.ha.namenode.2 = srwp20hnn203.stubprod.com8020
hadoop.ha.configProxyProvider = org.apache.hadoop.hdfs.server.namenode.ha.ConfiguredFailoverProxyProvider
#Hive Update statement test values
hive.update.statement.string = insert overwrite directory '/gaia/test/data/hivequery' select *
from student_activity where activityId >
10
hive.update.statement.user = hive
hive.update.statement.database = default
```

Another aspect of the present disclosure pertains to the fault tolerance capabilities of the data ingestion framework herein. In that regard, the data ingestion framework herein solves the problems surrounding in-flight data: when data is in motion, there is a requirement to move it as fast as possible from the source to the destination. However, if anything happens to a data adapter while it is loading data, all the in-flight data will be lost. So there is another pressure or requirement for data migration—fault tolerance and persistence. However, persistence has a negative impact on performance. Until recently, developers had to choose between performance and persistence when building data adapters.

However, with the introduction of Kafka, the tension between these two requirements can be resolved: Kafka is a "high throughput distributed message system", which uses a file system to store data. Kafka's unique features are produced by low-level OS (Operating System) libraries that provide the performance characteristics of an in-memory system with the persistence characteristics of a file system. Consequently, by using Kafka, the data ingestion framework herein gets the benefits of high throughput together with data persistence.

Figure 9:
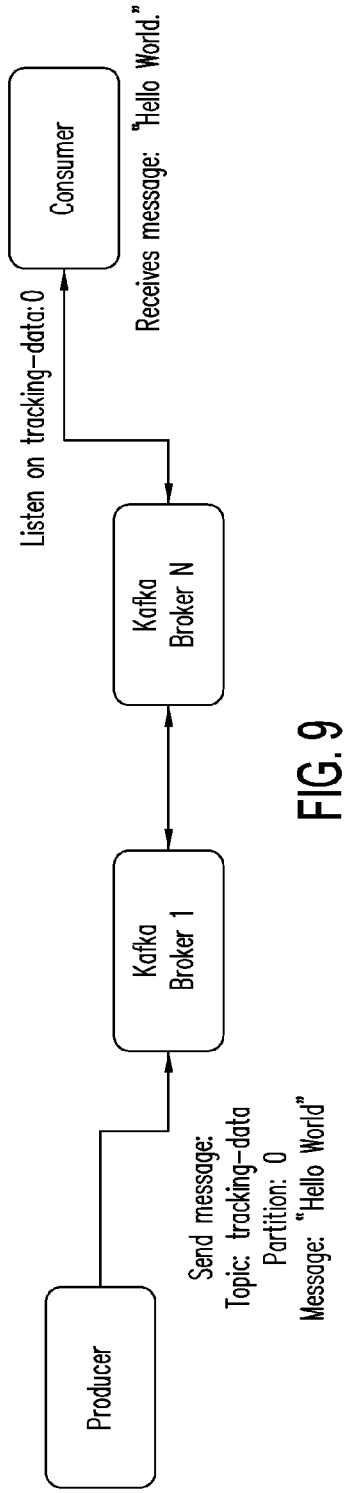
FIG. 9 illustrates a diagram showing data transmission according to a particular scheme various aspects of the present disclosure.

The data Adapters of the data ingestion framework herein extend Flume, which has the notion of a channel. Kafka works with topics and partitions stored in a "commit log". However, this apparent incompatibility can be resolved when Kafka's topics and partitions are mapped to Flume's notion of a channel. For example: A topic in Kafka can be any user-defined name, whereas a partition is always numbered from 0-N. An example of a topic could be "tracking-data," and it could have six partitions: –0-5. Consequently, if a producer writes some message to "tracking-data:0", then any consumer listening on topic "tracking-data" and partition "0" will receive that message. This is shown in FIG. 9.

Figure 10:
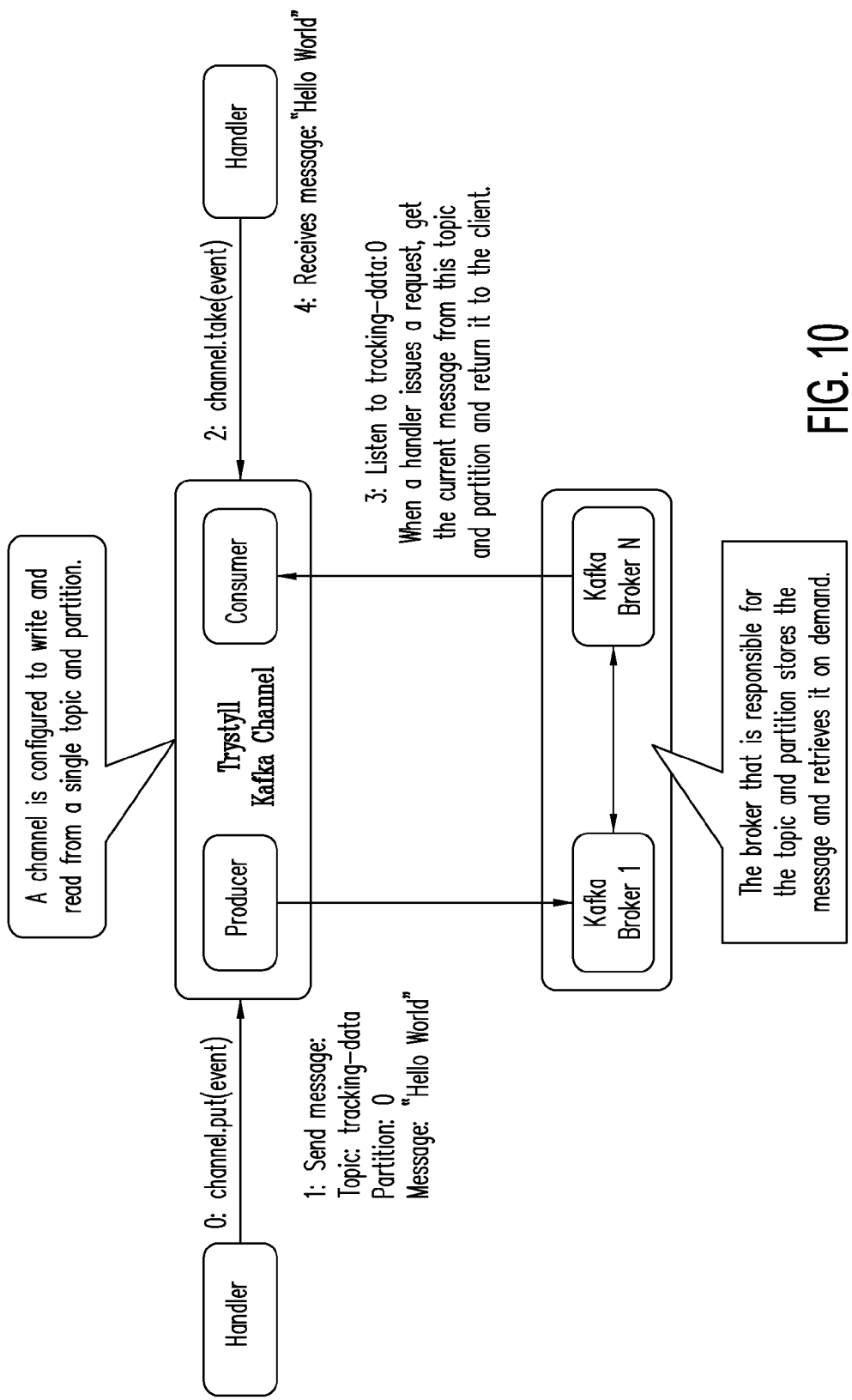
FIG. 10 illustrates a diagram showing a channel that can read from and write to a set of Brokers according to various aspects of the present disclosure.

Consequently, it becomes apparent that a Kafka topic and partition, when taken together, form a "channel" of communication. Messages can be written and received into this "channel". Using this model, the data ingestion framework herein defines a Kafka channel, which can read from, and write to, a set of Kafka brokers. FIG. 10 illustrates how the Kafka channel of the data ingestion framework herein reads from and writes to Kafka.

The data ingestion framework herein also uses a low level Kafka consumer. The reason this consumer is called a "low level consumer" is that unlike its counterpart—the high level consumer—it is topic and partition "aware". Because of this "awareness," the consumer of the data ingestion framework herein must know not only the topic and partition it is reading from, but the Kafka broker serving this topic and partition. It must also know how to recover from failures when the server currently delivering the topic and partition goes down. The low level consumer must also keep track of its own offsets.

Figure 11:
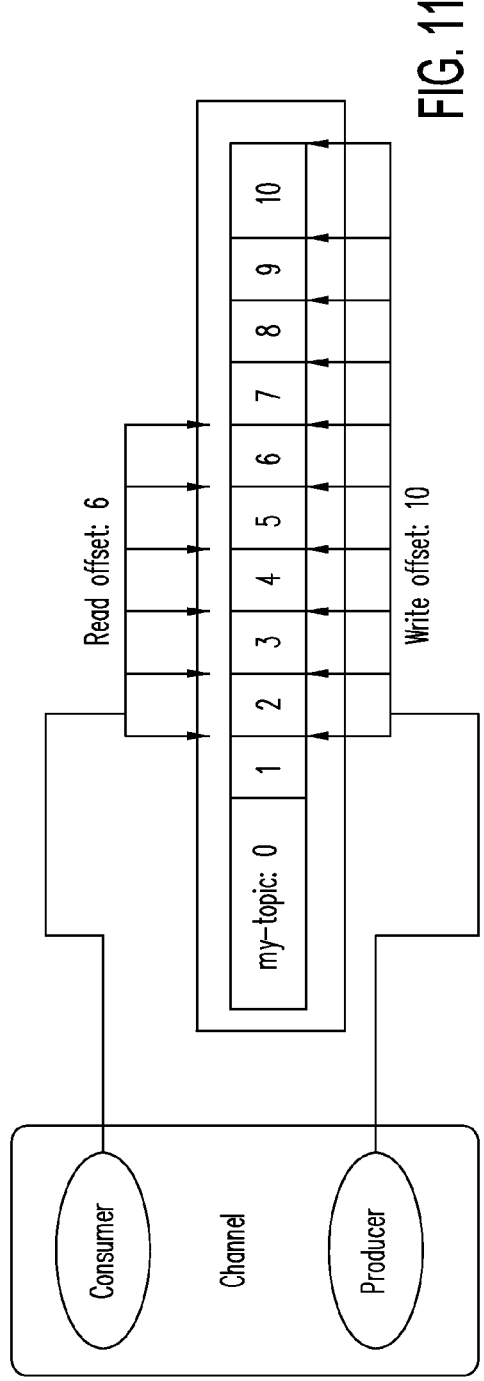
FIGS. 11-12 are diagrams illustrating the fault tolerance capabilities of a data ingestion framework according to various aspects of the present disclosure.
Figure 12:
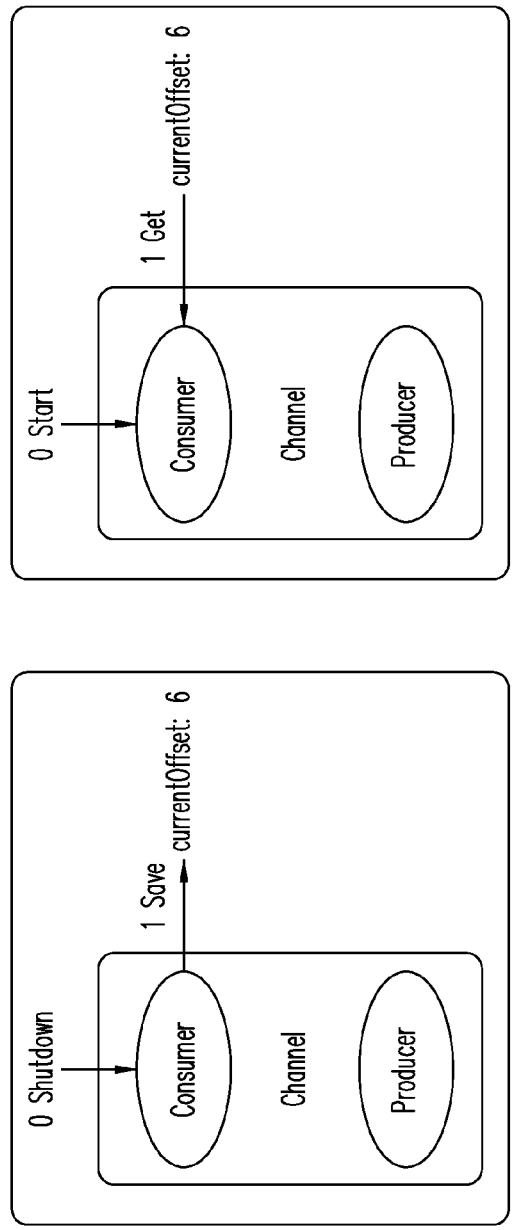

With reference to FIGS. 11-12, offsets come in two flavors: a write offset, managed by Kafka itself, and a read offset managed by the consumer that reads data from Kafka. When a producer sends a message to Kafka, it will be written to the appropriate topic and partition. In this example, the topic is my-topic, and the partition is 0. When the next message comes in, Kafka will place it after the first message it wrote to the log. The placeholder indicating the end of the last message and the beginning of a new message is called an offset. In this case, it is the write offset.

When a low-level consumer requests data from Kafka, it will initially ask it for the earliest message in the log, which is 1 in this case. From then on, the consumer will increment its offset by 1, so that it can consume messages in the order they were written. As stated earlier, the messages all belong to a topic called "my-topic" and a partition numbered 0.

However, one issue arises: when the consumer shuts down for any reason and then comes back up, what offset should it read from then? According to the data ingestion framework herein, when the adapter is shutdown, the consumer will save the last offset it read in a file whose name is the topic and partition and whose contents contains the last offset read from the topic and partition.

When the data adapter starts back up, the consumer configured for that topic and partition will look for a file with the same name, retrieve the offset and start up where the last instance left off. An example of this process is illustrated in FIG. 12. Note that there are various scenarios for saving offsets: an offset can be saved on transaction; it can be saved periodically—at a fixed time interval; it can be saved on shutdown. Currently, the data ingestion framework herein saves the offset when shutdown. But it is in the process of saving an offset on every completed transaction. This means that even on sudden system failures, an offset will be written that another instance of a data adapter can come up and resume where the last data adapter left off. The above implementation of the data ingestion framework herein helps ensure fault tolerance.

It is understood that the data ingestion framework herein contains infrastructure software that is designed to operate in an enterprise platform or enterprise server level. An enterprise server may refer to a computer having programs implanted thereon that collectively serve the needs of an enterprise rather than a single user, department, or specialized application. Though mainframe computers have historically been used as enterprise servers, UNIX and Windows based desktop and laptop computers have become powerful enough recently to also function as enterprise servers. In some embodiments, the data ingestion framework herein can be run in data centers or on a cloud computing server such as AWS (Amazon Web Services). Due to its dynamic wiring capabilities and versatility in handling different types of data sources and destinations, as well as its fault tolerance capabilities, the data ingestion framework herein is also ideally suited for data streaming services, where large amounts of data are moving through a medium in a continuous flow.

Figure 13:
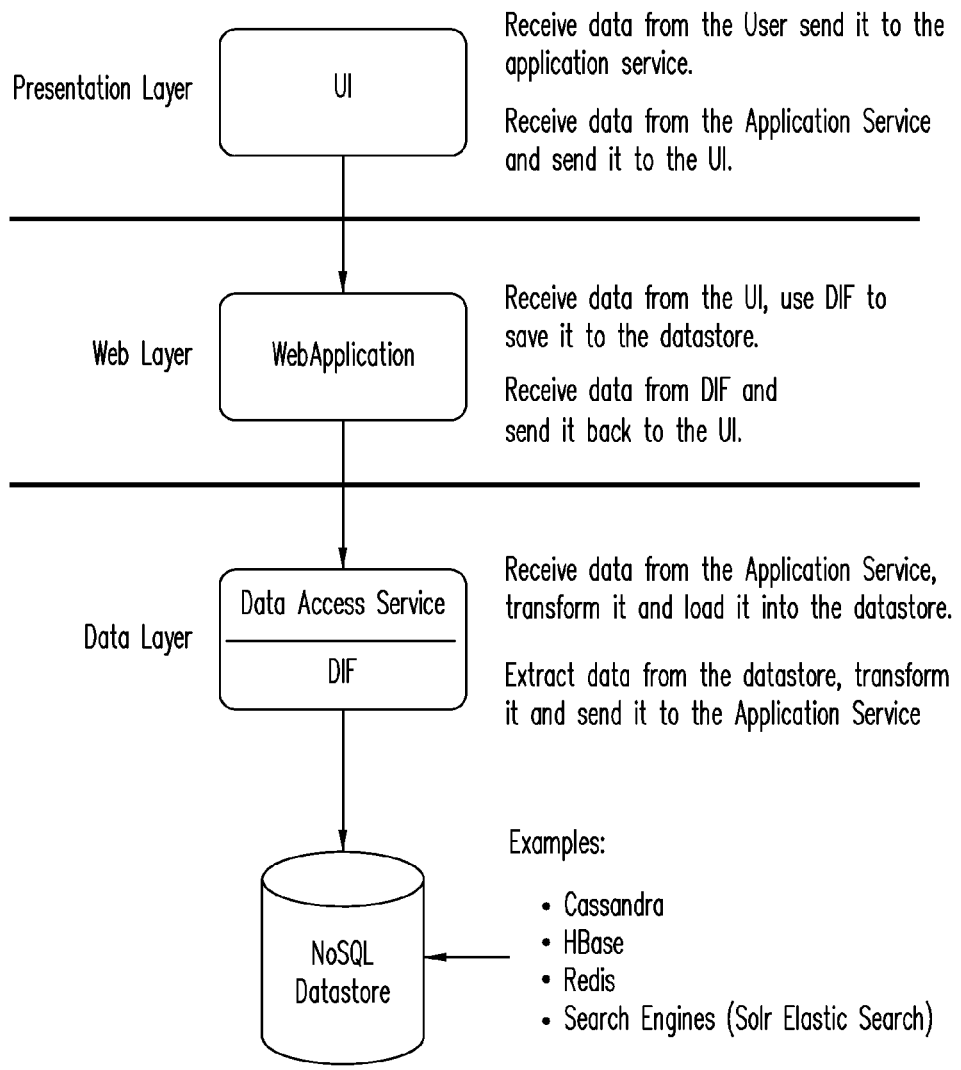
FIGS. 13-15 are high level block diagrams that illustrate some example usage scenarios for the data ingestion framework herein according to various aspects of the present disclosure.
Figure 14:
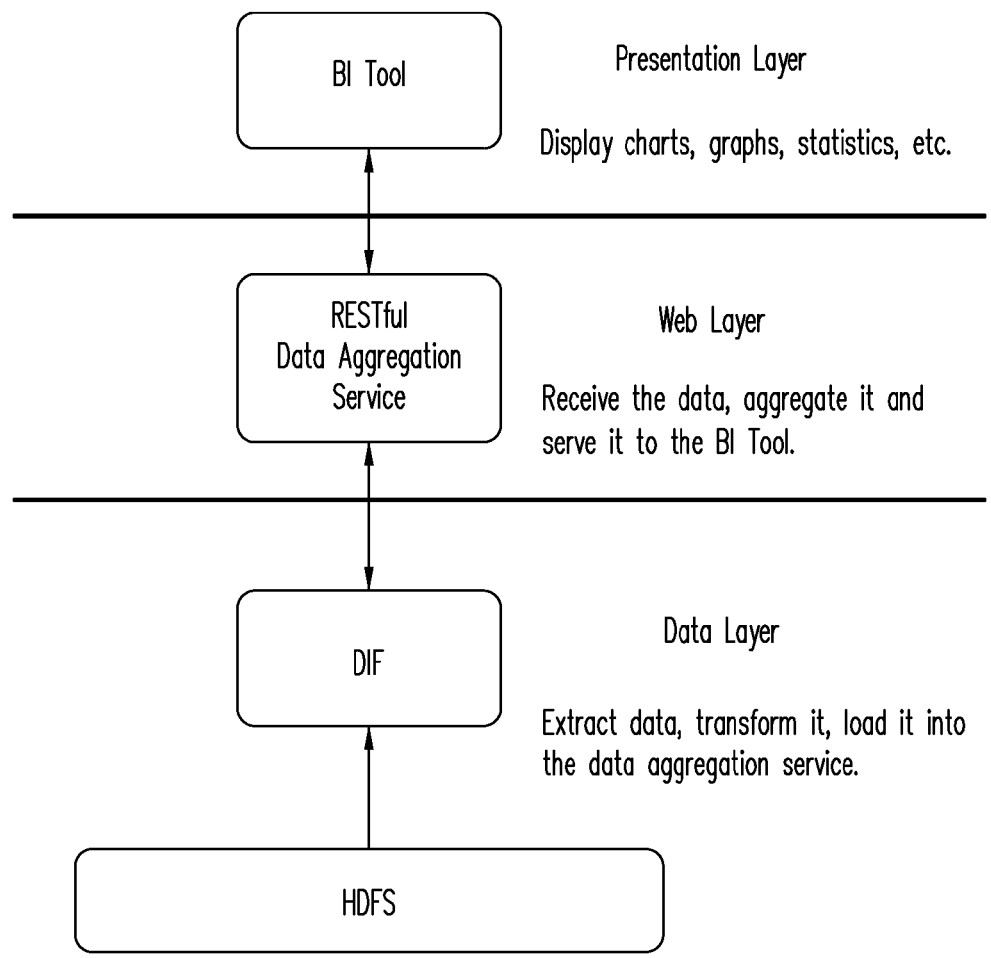
Figure 15:
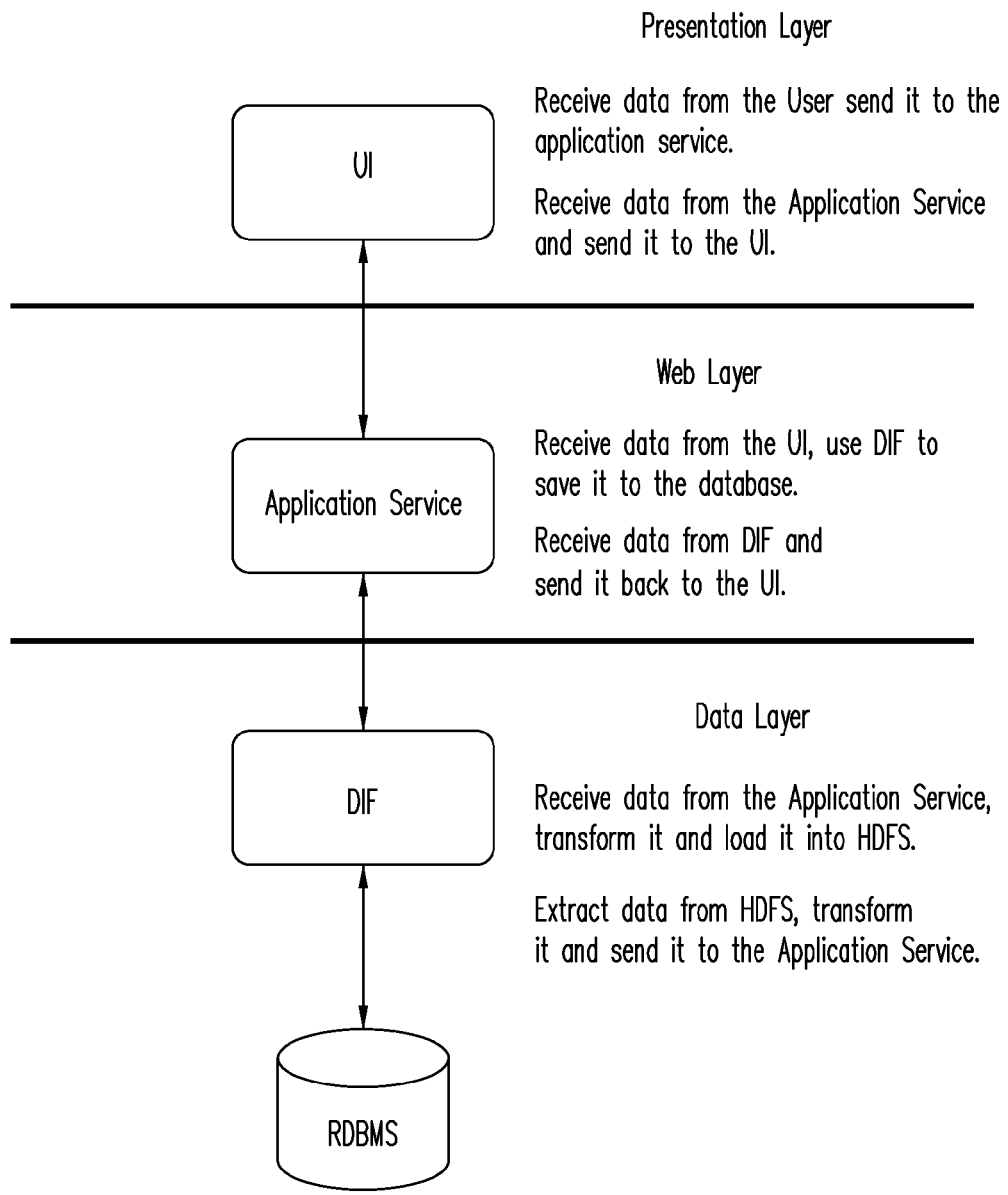

FIGS. 13-15 are high level block diagrams that illustrate some example usage scenarios for the data ingestion framework herein. For reasons of simplicity, the data ingestion framework is labeled as "DIF" in the block diagrams of FIGS. 13-15. It is understood that a box/block with "DIF" on it means that, for that box/block, all or some part of the data ingestion framework is being used for data extraction, data transformation, or data loading.

In more detail, FIG. 13 is an example high level block diagram illustrating a data access usage scenario. In a presentation layer, a User Interface (UI) receives data from a user and sends the data to the application service. Data may also be received from the application service and sent to the UI in the presentation layer. In a web layer, data is received from the UI, and the data ingestion framework of the present disclosure is used to save it to the data store. Data may also be received from the data ingestion framework of the present disclosure and sent back to the UI. In a data layer, a data access service receives data from the application service, transforms it and loads it into a datastore. The data may also be extracted from the data store, transformed and sent back to the application service. The data stores may include, as examples, a noSQL data source like HBase, Cassandra, Redis, search engines, etc. In this context, since NoSQL data stores are typically schema-less, the data ingestion framework herein could be used as a mapping layer which can ingest data provided by an application and transform it into its data storage format (binary, JSON, XML, etc), and on the other end retrieve the data from the data store and transform it into the format required by the application.

FIG. 14 is an example high level block diagram illustrating a data publishing usage scenario. This may also be referred to as a business intelligence (BI) use case. In a data layer, the data ingestion framework herein extracts data (e.g., from a HDFS server), transforms the data, and loads the transformed data into a data aggregation service. In a web layer, a RESTful data aggregation service receives the data from the data layer, aggregates the data, and then serves the data to a business intelligence tool. In a presentation layer, the BI tool may be used to display charts, graphs, statistics, etc., based on the analytic data received from the data ingestion framework (through the web layer).

FIG. 15 is an example high level block diagram illustrating an application to RDBMS (relational database management system) usage scenario. In a presentation layer, a User Interface (UI) receives data from a user and sends the data to an application service. Data may also be received from the application service and sent to the UI in the presentation layer. In a web layer, data is received from the UI, and the data ingestion framework of the present disclosure is used to save it to the data store. Data may also be received from the data ingestion framework of the present disclosure and sent back to the UI. In a data layer, the data ingestion framework of the present disclosure receives data from the application service, transforms it, and loads it into HDFS (or RDBMS). The data ingestion framework herein may also extract data from HDFS (or RDBMS), transform the data, and send the transformed data to the application service in the web layer.

Figure 16:
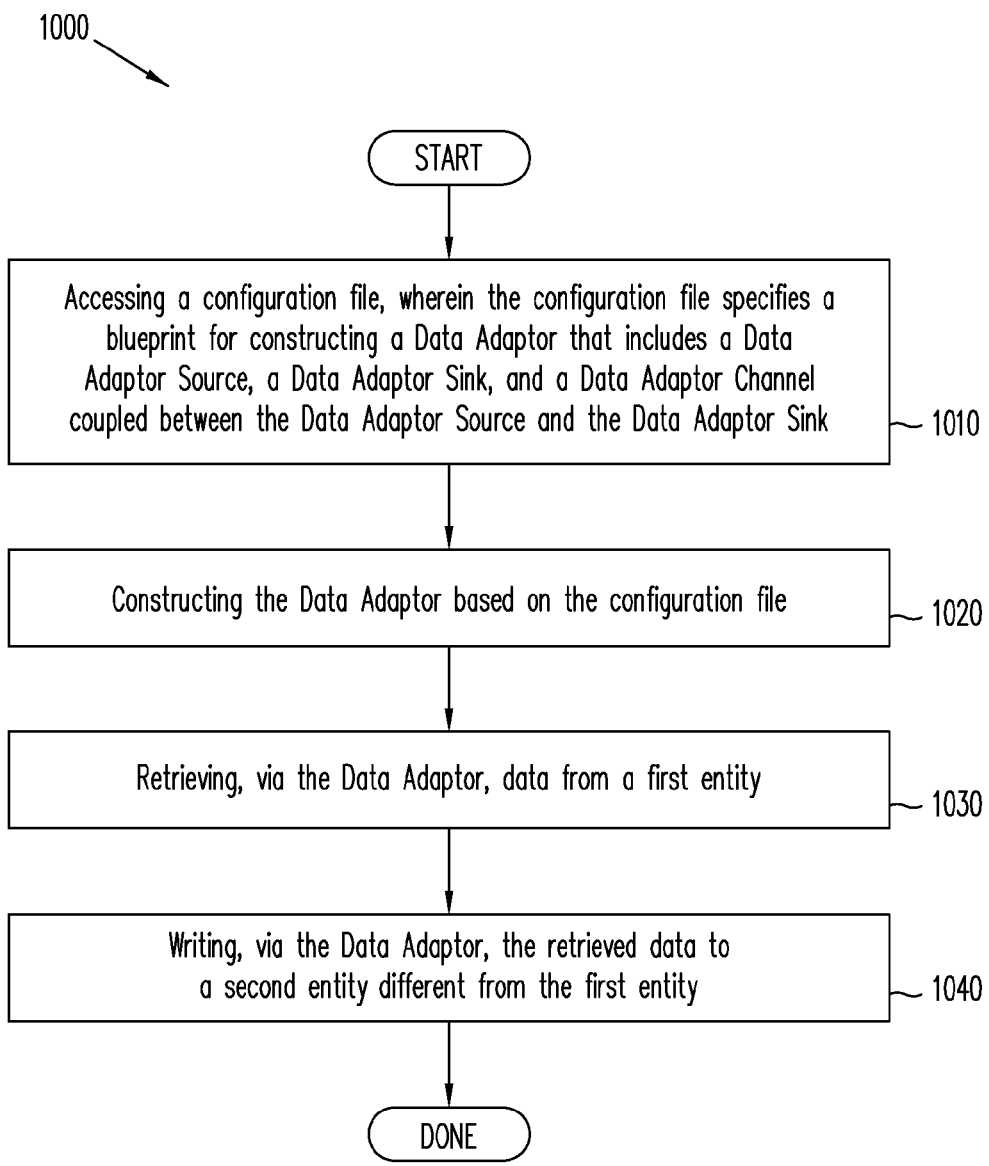
FIG. 16 is a flowchart showing a method for ingesting data in an enterprise server environment according to various aspects of the present disclosure.

FIG. 16 is a flowchart of a method 1000 of ingesting data in an enterprise server environment. The method 1000 includes a step 1010 of accessing a configuration file. The configuration file specifies a blueprint for constructing a data adaptor that includes a data adaptor source, a data adaptor sink, and a data adaptor channel coupled between the data adaptor source and the data adaptor sink. The method 1000 includes a step 1020 of constructing the data adaptor based on the configuration file. The method 1000 includes a step 1030 of retrieving, via the data adaptor, data from a first entity. The method 1000 includes a step 1040 of writing, via the data adaptor, the retrieved data to a second entity different from the first entity. It is understood that the steps 1010-1040 are performed by one or more electronic processors, for example electronic processors on an enterprise server or a computer in a data center.

In some embodiments, the configuration file is written in JavaScript Object Notation (JSON).

In some embodiments, the data adaptor source is configured to manage one or more source data handlers, and the data adaptor sink is configured to manage one or more sink data handlers. The one or more source data handlers and the one or more sink data handlers are coupled together via the data adaptor channel. In some embodiments, the one or more source data handlers include: a first source data handler configured to import the data from the first entity; and a second source data handler configured to write the imported data to the data adaptor channel. In some embodiments, the one or more sink data handlers include: a first sink data handler configured to filter, scrub, or restructure the data received from the data adaptor channel; and a second sink data handler configured to write the filtered, scrubbed, or restructured data to the second entity.

In some embodiments, the constructing of the data adaptor comprises constructing a data adaptor that includes multiple data adaptor sinks that are each coupled to the data adaptor source via a respective data adaptor channel.

In some embodiments, the first entity and the second entity are different types of data sources.

The following are some of the features of the data ingestion framework herein

Lightweight: It is a compact data ingestion framework. It is not opinionated about the data being ingested, transformed or loaded. It can fit into an application or be distributed across servers. All concrete implementations are plugged into the framework, but the framework itself is small and integrates into diverse applications and environments.

Configuration driven: It takes user specified configuration and wires up a data adapter from it. It also manages the lifecycle of that data adapter.

Modular: It is modular and based on plugins. It has the capabilities to load any viable handler and wire it up into a pipeline. Modules or plugins can be added and removed from a flow without impacting the framework itself.

Adaptive: Due to its configurable nature, it can adapt to diverse applications: it can be run as a data adapter; it can be housed in an application; it can be integrated into larger platforms, and it can be distributed across servers.

Streaming data adaptor: Due to its integration with Kafka using a low level consumer, it can stream data through the system. With a configuration of 10 channels, with messages sizes of 9K, the throughput—at the channel level—is about 400-600 MB per second.

Fine grained data Transformation: it has an alliance with Flume. Not only can data be transformed in a pipeline, it can leverage Flume's interceptor to execute fine-grained transformations of the data. This is because it uses Flume's channel Selectors and channel Processors, which have Interceptors built in. This means that developers can add their own interceptors to filter and cleanse particular data streams prior to writing it into a channel.

Data flow and control: Due to its capabilities to receive data on a topic and partition basis, it can control the flow of data to diverse locations. This includes: other data adapters, other data sources and of course, sinks that have specialized processors to handle this data. This corresponds to Flume's fan out capabilities.

Based on the discussions above, the data ingestion framework herein offers advantages over existing methods and systems of data ingestion. It is understood, however, that not all advantages are discussed herein, other embodiments may offer different advantages, and that no particular advantage is required for all embodiments. In some embodiments, the advantages include the following:

Modular configuration-driven development. By using modular components that can be mixed and matched, developers can build data adapters more quickly and reliably. As the number of plugins grows, developers will have less and less boilerplate code to write and can use existing plugins for the common tasks and then focus on the special behaviors needed for their use case.

Time to Market. By providing a set of well-used components, the data ingestion framework disclosed herein shortens the time taken to develop a data adapter. Instead of focusing on building and wiring up a data adapter, developers can focus only on the new components they are developing. The other components can be taken from a library and reused as necessary. This increases the velocity of development cycle.

Robust: Since components or Handlers are only added to the core framework when they meet certain criteria like reusability, reliability, modularity, performance, scalability and so on, developers get the benefit of a robust framework that enhances their capability to build and deploy reliable and robust data adapters.

High Performance: Developers do not have to use the Kafka channel that is provided by the data ingestion framework herein. However, if they do, they get the benefit of channels that can stream data from a source to a destination.

Scalable: the data ingestion framework herein can scale from the small to the large. It is very flexible: One adapter can feed into another. channels can branch out to one or more other adapters. And, internally, the data ingestion framework herein can expand the number of channels to meet increasing demand. And since the framework is componentized, it could be distributed across several servers with the source in one server, channels in another server and the sinks on a third set of servers. These enterprise patterns are built into Flume and the data ingestion framework herein inherits and extends them.

Diverse Applications: the data ingestion framework herein can be used in many applications where data migration and transformation is required. Its most common use case is to migrate data into HDFS. But this is not its only application. Because of its plugin capability, users can retrieve data from sources like MongoDB, RDBMS', Kafka, file systems and even custom data generating services. The same is true for the sink side. The data ingestion framework herein can write to HDFS, HBase, Solr, Cassandra, Solr, Aerospike or any viable target location. Interestingly, the data ingestion framework herein can be used within an application or service to process data or execute a set of sequential commands.

Figure 17:
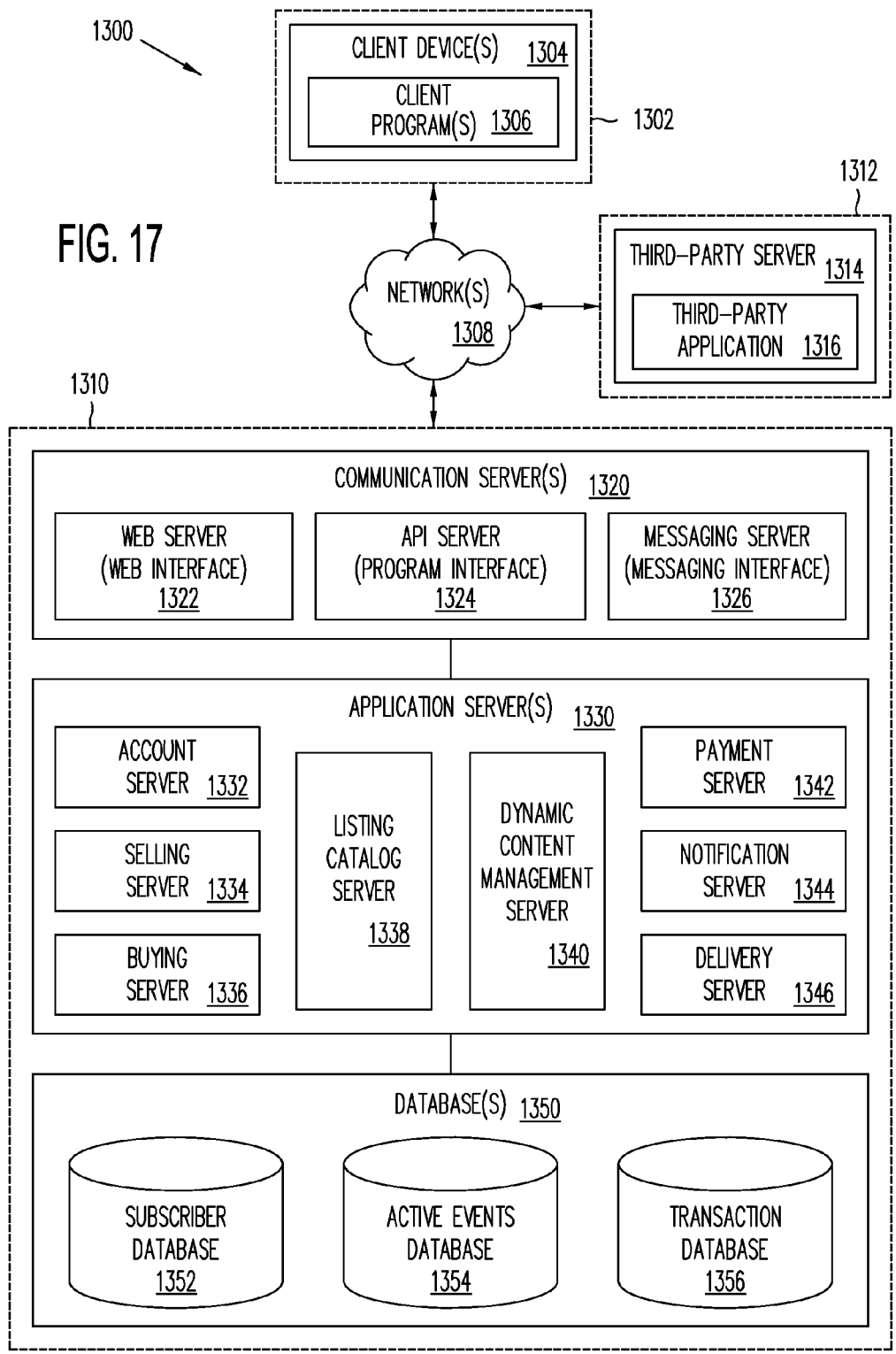
FIG. 17 is a block diagram of a communications system including a network-based system for providing online marketplace and ticket fulfillment services suitable for implementing processes described herein according to one embodiment.

As discussed above, the data ingestion framework discussed above may be implemented in an enterprise environment where large quantities of data are consumed. For example, it may be implemented for commercial communications systems that include various servers to handle user purchases, payments, analytics, etc. FIG. 17 illustrates a communications system 1300 that may include some of the servers between which the data ingestion discussed above may take place. The elements of communications system 1300 generally may comprise physical or logical entities for communicating information and, in some cases, may be implemented as hardware, software, or combination thereof, as desired for a given set of design parameters or performance constraints. Although FIG. 17 includes a limited number of elements for purposes of illustration, it can be appreciated that communications system 1300 may include more or less elements as well as other types of elements.

Various elements of communications system 1300 may be implemented utilizing one or more computing devices having computing and/or communications capabilities in accordance with the described embodiments. Exemplary computing devices may include, without limitation, a mobile device, a personal digital assistant (PDA), a mobile computing device, a communications device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a minicomputer, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by communications system 1300 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components. Exemplary software components may include computer programs, applications, application programs, system programs, operating system (OS) software, middleware, firmware, a software interface, a programmatic interface, an application program interfaces (API), a network interface, a web interface, a messaging interface, modules, instruction sets, routines, subroutines, functions, calls, computing code, or combination thereof.

Various elements of communications system 1300 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and so forth.

Various elements of communications system 1300 may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, LTE, WIMAX, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/ 1×RTT, GSM/GPRS, EDGE, HSDPA, HSUPA, and others.

Computing devices and networks may support wireless local area network (WLAN) and/or wireless metropolitan are network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electro-magnetic induction (EMI) communication, passive or active RFID communication, micro-impulse radar (MIR), ultra-wide band (UWB) communication, automatic identification and data capture (AIDC) communication, and others.

In the embodiment shown in FIG. 17, communications system 1300 includes, among other elements, a client 1302 which may comprise or employ one or more client devices 1304 such as a mobile computing device, a PC, and/or any other computing device having computing and/or communications capabilities in accordance with the described embodiments. Client devices 1304 generally may provide one or more client programs 1306 such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. In some usage scenarios, one or more of client programs 1306 may display various graphical user interfaces (GUIs) to present information to and/or receive information from one or more of client devices 1304.

As shown, client 1302 is communicatively coupled via one or more networks 1308 to a network-based system 1310. Network-based system 1310 may be structured, arranged, and/or configured to allow client 1302 to establish one or more communications sessions with network-based system 1310 using various computing devices 1304 and/or client programs 1306. Accordingly, a communications session between client 1302 and network-based system 1310 may involve the unidirectional and/or bidirectional exchange of information and may occur over one or more types of networks 1308 depending on the mode of communication. While the embodiment of FIG. 17 illustrates communications system 1300 deployed in a client-server operating environment, it is to be understood that other suitable operating environments and/or architectures may be used in accordance with the described embodiments.

Data and/or voice communications between client 1302 and the network-based system 1310 may be sent and received over one or more networks 1308 such as the Internet, a WAN, a WWAN, a WLAN, a mobile telephone network, a landline telephone network, a VoIP network, as well as other suitable networks. For example, client 1302 may communicate with network-based system 1310 over the Internet or other suitable WAN by sending and or receiving information via interaction with a web site, e-mail, IM session, and/or video messaging session. Client 1302 also may communicate with network-based system 1310 via a telephone call to a customer service agent and/or interactive voice response (IVR) system made over a mobile telephone network, a landline network, and/or a VoIP network. In wireless implementations, client 1302 may communicate with network-based system 1310 over the Internet via a WLAN or mobile telephone network that supports WWAN communications services. Client 1302 also may communicate over a mobile telephone network via SMS and/or MMS messaging. It is to be appreciated that the embodiments are not limited in this regard.

In various usage scenarios, communication sessions and/ or messaging between client 1302 and network-based system 1310 may involve multiple modes of communication and/or multiple networks. In some cases, for example, client 1302 may initiate communication with network-based system 1310 by interacting with a web site. In response, network-based system 1310 may communicate with client 1302 in a variety of ways such as via the web site, e-mail, IM, SMS, MMS, and/or a telephone call from a customer service agent and/or IVR system. The communication from network-based system 110 may comprise a message (e.g., e-mail, IM, SMS, MMS) containing relevant static or dynamic content, an embedded hyperlinked URL for directing client 1302 to a web site, and/or a hyperlinked telephone number for allowing client 1302 to click and place a telephone call to an agent (e.g., customer service agent and/or IVR system) of network-based system 1310.

When communicating with network-based system 1310, client 1302 may employ one or more client devices 1304 and/or client programs 1306. In various implementations, client devices 1304 and/or client programs 1306 may host or provide one or more interfaces for communicating with network-based system 1310. Exemplary interfaces may include a web interface, an API interface, a messaging interface, and/or other suitable communication interface in accordance with the described embodiments. Client programs 1306 for communicating with network-based system 1310 may comprise, for example, pre-installed, authored, downloaded, and/or web-based computer programs.

Client programs 1306 provided by one or more of client devices 1304 (e.g., mobile computing device and/or PC) may include a web client. The web client may comprise, for example, a desktop and/or mobile (e.g., WAP) web browser (e.g., Internet Explorer®, Mozilla®, Firefox®, Safari®, Opera®, Netscape Navigator®, etc.) capable of rendering web pages (e.g., HTML documents) and supporting various browser-based web technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others.

In various usage scenarios, client 1302 may use a web client to provide an interface (e.g., HTTP interface) for navigating to a web site associated with network-based system 1310 and for requesting and receiving web page data from network-based system 1310. For example, client 1302 may use the web client to navigate to a web site associated with network-based system 1310 by entering a URL into a web browser address bar and/or by clicking on a hyperlinked URL delivered to client 1302 via a web page, web-based application, e-mail, IM, SMS, MMS, and/or other delivery mechanism.

In one or more embodiments, the web client may comprise or be implemented as a web browser toolbar for communicating with network-based system 1310. In such embodiments, the web browser toolbar may include, for example, a button (e.g., dedicated, customized, add-on) and/or a hyperlinked URL for navigating to a web site associated with network-based system 1310. The web browser toolbar also may implement enhanced features such as a search engine interface (e.g., text entry box, input fields, checkboxes, clickable hyperlinks) and/or one or more pull-down menus for accessing network-based system 1310, sending information (e.g., search query, keywords, user preferences, menu selections) to network-based system 1310, and/or receiving information (e.g., search results, relevant static or dynamic content) from network-based system 1310.

In one or more embodiments, the web client may comprise or be implemented as a widget such as a desktop or mobile widget for communicating with network-based system 1310. In such embodiments, the desktop or mobile widget may comprise web-based code, an interpreter, a virtual machine, and/or an API implementation to request, receive, present, and/or update content hosted by network-based system 1310. The desktop or mobile widget may comprise, for example, a client-side web application displayed on the desktop or phone-top of one or more of client devices 1304 implemented using various web technologies and programming languages. In various implementations, the desktop or mobile widget may be supported by a host runtime environment such as a web browser or suitable rendering engine and/or may be installed and run as a stand-alone application outside of a web browser.

In various embodiments, the network-based system 1310 may provide users with one or more client-side web applications as described in co-pending U.S. patent application Ser. No. 12/275,783 titled "System and Methods for Providing Location-Based Upcoming Event Information Using a Client-Side Web Application Implemented on a Client Device," which was filed on Nov. 21, 2008 and is incorporated by reference in its entirety. In such embodiments, once downloaded and installed on a client device (e.g., PC or mobile device) of the user, the client-side web application may be configured to provide upcoming event information based upon the location of the user.

As shown in FIG. 17, communications system 1300 includes, among other elements, a third party 1312 which may comprise or employ a third-party server 1314 hosting a third-party application 1316. In various implementations, third-party server 1314 and/or third-party application 1316 may host a web site associated with or employed by a third party 1312 such as an affiliate, partner, or other third-party entity or user in accordance with the described embodiments. It can be appreciated that, in some implementations, third party 1312 may provide third-party application 1316 for promoting, enhancing, complementing, supplementing, and/or substituting for one more services provided by network-based system 1310. For example, third-party server 1314 and/or third-party application 1316 may enable network-based system 1310 to provide client 1302 with additional services and/or information such as additional ticket inventory.

In some usage scenarios, one or more of client programs 1306 may be used to access network-based system 1310 via third party 1312. For example, client 1302 may use a web client to access and/or receive content from network-based system 1310 after initially communicating with a third-party web site. The web site of third party 1312 (e.g., affiliate, partner) may comprise, for example, a hyperlinked advertisement, a web widget, and/or an API implementation comprising web-based code within a web page to present static or dynamic content hosted by network-based system 1310 and/or to provide programmatic access to network-based system 1310.

It can be appreciated that the hyperlinked advertisement, web widget, and/or API implementation for communicating with network-based system 1310 may be hosted by various third-party web sites such as an affiliate web site, a partner web site, an online marketplace web site, an entertainment web site, a sports web site, a media web site, a search engine web site, a social networking web site, a blog, and/or any other corporate or personal web site or web page in accordance with the described embodiments. In some cases, third party 1312 may be directly or indirectly compensated for directing traffic from the third-party web site to the web site of network-based system 1310 and/or in the event that an electronic commerce transaction results after a user is directed from the third-party web sites to the web site of network-based system 1310.

In various embodiments, the web client and/or the network-based system 1310 may provide the user with the ability to receive and aggregate content and/or online marketplace and ticket fulfillment services of network-based system 1310 and other third-party services (eBay® services, Kijiji™ services, PayPal™ services, etc.). For example, the web client may display location-based upcoming event information that includes event listings published by sellers via the online marketplace services of network-based system 1310 as well as event listings published by sellers via one or more third-party online marketplace services (e.g., eBay® services, Kijiji™ services). In such embodiments, the client-side web application may display an aggregate of ticket inventory available from multiple online marketplaces providing the user with multiple purchasing options.

Client programs 1306 executed by one or more of client devices 1304 may include a programmatic client for accessing and communicating with network-based system 1310. Along with performing a certain set of functions, the programmatic client may include, for example, an implementation of an API provided by network-based system 1310 for enabling access to and/or communication with various elements (e.g., servers, databases) of network-based system 1310. In various embodiments, the API implementation may comprise executable code in accordance with an SDK provided by network-based system 1310.

In some usage scenarios, the programmatic client may be implemented as a stand-alone or web-based database, point-of-sale (POS), and/or inventory management application for managing a large volume of available inventory and communicating with network-based system 1310. The programmatic client may be employed, for example, by high-volume sellers to author, update, and manage a large number of inventory listings. In some cases, a high-volume seller may use the programmatic client to perform batch-mode communication with network-based system 1310. The batch-mode communication from the high-volume seller may comprise data for numerous inventory items (e.g., hundreds, thousands) for publication by network-based system 1310. The programmatic client also may be used to communicate with the network-based systems in real-time. For example, communications from the high-volume seller may comprise real-time inventory updates so that the listings published by network-based system 1310 accurately reflect the available inventory of the high-volume seller.

Client programs 1306 executed by one or more of client devices 1304 (e.g., mobile computing device and/or PC) also may include a messaging client. The messaging client may comprise, for example, an application that supports one or more modes of communication such as e-mail, IM, SMS, MMS, telephone, VoIP, video messaging, and so forth. It can be appreciated that some messaging clients may require and/or launch an Internet connection in the background when executed.

In accordance with various embodiments, network-based system 1310 may communicate with and provide services to users such as buyers and/or sellers of goods such as event tickets. For example, network-based system 1310 may comprise or implement an online ticket marketplace for buyers and sellers of tickets for live events such as sports, concerts, theater, and other entertainment events.

It is to be appreciated that goods for purchase and/or sale may include both tangible goods (e.g., physical tickets, electronic tickets), intangible goods (e.g., rights and/or licenses that are afforded by the tickets), and other goods in accordance with the described embodiments. It also is to be appreciated that users other than buyers and/or sellers may communicate with network-based system 1310. In some cases, for example, client 1302 may be associated with an administrator or customer service agent and may communicate with network-based system 1310 to monitor, update, and/or otherwise manage one or more computing devices and/or services of network-based system 1310.

FIG. 17 illustrates an exemplary embodiment of network-based system 1310 for providing online ticket marketplace. As shown, network-based system 1310 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 17 may be deployed in other ways and that the operations performed and/or the services provided by such servers may be combined or separated for a given implementation and may be performed by a greater number or fewer number of servers. One or more servers may be operated and/or maintained by the same or different entities.

In various implementations, the servers of network-based system 1310 may comprise or implement software components deployed in a tiered environment, where one or more servers are used to host server software running in each tier. For example, using a three-tiered architecture, one or more server software components may be hosted by front-end servers, one more server software components may be hosted by a middle tier or middleware implemented by application servers, and one more server software components may be hosted by a back-end tier implemented by databases and/or file systems. In some embodiments, servers of network-based system 1310 may be communicatively coupled with each other via a local area network (LAN) and/or suitable intranet or back-end network.

Network-based system 1310 may comprise one or more communications servers 1320 for providing suitable interfaces to enable communication using various modes of communication and/or via one or more networks 1308. In the embodiment of FIG. 17, the communications servers 1312 include a web server 1322, an API server 1324, and a messaging server 1326 to provide interfaces to one or more application servers 1330. Application servers 1330 of network-based system 1310 may be structured, arranged, and/or configured to provide various online marketplace and/or ticket fulfillment services to users that access network-based system 1310.

In various usage scenarios, client 1302 may communicate with applications servers 1330 of network-based system 1310 via one or more of a web interface provided by web server 1322, a programmatic interface provided by API server 1324, and a messaging interface provided by messaging server 1326. It can be appreciated that web server 1322, API server 1324, and messaging server 1326 may be structured, arranged, and/or configured to communicate with various types of client devices 1304 and/or client programs 1306 and may interoperate with each other in some implementations.

Web server 1322 may be arranged to host web pages (e.g., HTML documents) and provide an appropriate web interface (e.g., HTTP, CGI, etc.) for enabling data to be presented to and received from entities via the Internet. Web server 1322 may be arranged to communicate with web clients and/or applications such as a web browser, web browser toolbar, desktop widget, mobile widget, web-based application, web-based interpreter, virtual machine, and so forth. Web server 1322 may provide a web interface to enable access by client 1302 and/or third party 1312 to the various services and functions provided by application servers 1330. For example, web server 1322 may be arranged to receive data from client 1302 and/or third party 1312 and to pass the data to one or more application servers 1330 within network-based system 1310. Web server 1322 also may present client 1302 and/or third party 1312 with relevant static and dynamic content hosted by network-based system 1310 in response to various requests and/or events.

API server 1324 may be arranged to communicate with various client programs 1306 and/or a third-party application 1316 (e.g., third-party web site) comprising an implementation of API for network-based system 1310. API server 1324 may provide a programmatic interface to enable access by client 1302 and/or third party 1312 to the various services and functions provided by application servers 1330. For example, the programmatic interface provided by API server 1324 may be used for batch-mode and/or real-time communication with a high-volume seller for receiving and updating inventory listings. The programmatic interface provided by API server 1324 also may be used to communicate relevant static or dynamic content hosted by network-based system 1310 to an API implementation of one or more client programs 1306 and/or a third-party application 1316 (e.g., third-party web site). The API implementation may comprise, for example, executable code in accordance with a SDK provided by network-based system 1310.

Messaging server 1326 may be arranged to communicate with various messaging clients and/or applications such as e-mail, IM, SMS, MMS, telephone, VoIP, video messaging, and so forth. Messaging server 1326 may provide a messaging interface to enable access by client 1302 and/or third party 1312 to the various services and functions provided by application servers 1330. For example, the messaging interface provided by messaging server 1326 may be used to communicate with client 1302 and/or third party 1312 in a variety of ways such as via e-mail, IM, SMS, MMS, video messaging, and/or a telephone call (e.g., landline, mobile, VoIP) with a customer service agent and/or IVR system.

When implemented as an online ticket marketplace, application servers 1330 of network-based system 1310 may provide various online marketplace and ticket fulfillment services including, for example, account services, buying services, selling services, listing catalog services, dynamic content management services, delivery services, payment services, and notification services. In the exemplary embodiment shown in FIG. 17, application servers 1330 may comprise an account server 1332, a buying server 1334, a selling server 1336, a listing catalog server 1338, a dynamic content management server 1340, a payment server 1342, a notification server 1344, and a delivery server 1346 structured and arranged to provide such online marketplace and ticket fulfillment services.

Application servers 1330, in turn, may be coupled to and capable of accessing one or more databases 1350 including a subscriber database 1352, an active events database 1354, and a transaction database 1356. databases 1350 generally may store and maintain various types of information for use by application servers 1330 and may comprise or be implemented by various types of computer storage devices (e.g., servers, memory) and/or database structures (e.g., relational, object-oriented, hierarchical, dimensional, network) in accordance with the described embodiments.

Account server 1332 implemented by one or more of application servers 1330 may allow a user to establish and/or manage a subscriber account with network-based system 1310. For example, while some services provided by network-based system 1310 may be generally accessible, a user may be required to access an existing subscriber account or register a new subscriber account with network-based system 1310 in order to receive certain customized and/or subscriber-specific services.

To create a subscriber account, a user may provide network-based system 1310 with account information such as a unique username, e-mail address, password, name, location (e.g., address, city, country, and/or zip code), telephone numbers (e.g., home, work, and/or mobile), and/or other required information for identifying and/or authenticating the user. After receiving the required account information and instructions from the user to create the subscriber account, network-based system 1310 may create the subscriber account and store the account information in subscriber database 1352.

As described above, network-based system 1310 may communicate with users over one or more types of networks 1308 via interfaces provided communications servers 1320 and provide various services to users such as online marketplace and ticket fulfillment services via application servers 1330 and databases 1350. When servicing a user, network-based system 1310 may present information to and/or receive information from the user in a variety of ways such by displaying and receiving information via user interfaces (e.g., web pages, interactive screens), sending and receiving messages (e.g., e-mail, IM, SMS, MMS, video message), placing and/or receiving telephone calls (e.g., landline, mobile, VoIP, IVR calls), and so forth. User interfaces also may be displayed to a user via one or more client programs 1306 such as a web client (e.g., web browser, desktop or mobile widget, web browser toolbar) and/or a third-party application 1316.

It is understood that the various servers discussed above with reference to FIG. 17 may be owned by a single entity, or by two or more separate entities. The various servers discussed above may also be operated by a single entity, or by two or more separate entities. In addition, although FIG. 17 illustrates the server separately, some of these servers may be integrated together, and some of the servers may also perform the functionalities of other servers.

It is also understood that the data ingestion described above in association with FIGS. 1-16 may also be performed by (or between) various components shown in FIG. 17. For example, the data ingestion framework (e.g., the data adaptor discussed above) may be used to pull data from the databases 1350, transform the data, and store the data in some other datastore like HDFS, HBase, search engines (Solr, Elastic Search), document stores (MongoDB), Cassandra, etc.

Figure 18:
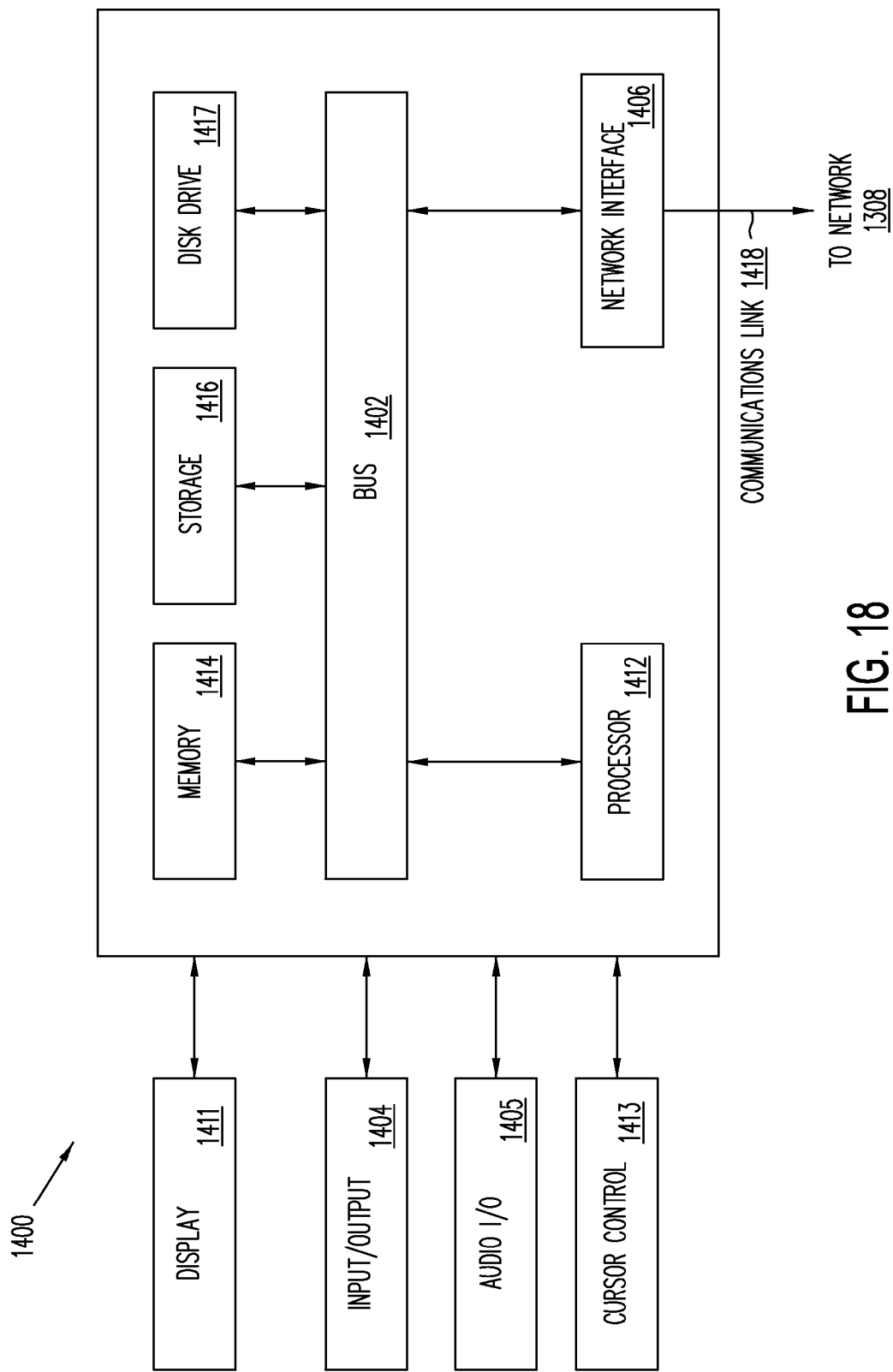
FIG. 18 is a block diagram of a computer system suitable for implementing one or more components in FIG. 17 according to one embodiment.

FIG. 18 is a block diagram of a computer system 1400 suitable for implementing one or more devices of the present disclosure. In various implementations, a device may comprise a personal computing device (e.g., smart phone, a computing tablet, a personal computer, laptop, PDA, Bluetooth device, key FOB, badge, etc.) capable of communicating with the network. The ticket provider and/or a payment provider may utilize a network computing device (e.g., a network server) capable of communicating with the network. It should be appreciated that each of the devices utilized by users, ticket providers, and payment providers may be implemented as computer system 1400 in a manner as follows.

Computer system 1400 includes a bus 1402 or other communication mechanism for communicating information data, signals, and information between various components of computer system 1400. Components include an input/output (I/O) component 1404 that processes a user action, such as selecting keys from a keypad/keyboard, selecting one or more buttons or links, etc., and sends a corresponding signal to bus 1402. I/O component 1404 may also include an output component, such as a display 1411 and a cursor control 1413 (such as a keyboard, keypad, mouse, etc.). An optional audio input/output component 1405 may also be included to allow a user to use voice for inputting information by converting audio signals. Audio I/O component 1405 may allow the user to hear audio. A transceiver or network interface 1406 transmits and receives signals between computer system 1400 and other devices, such as another user device, a merchant server, or a payment provider server via a network. In one embodiment, the transmission is wireless, although other transmission mediums and methods may also be suitable. A processor 1412, which can be a micro-controller, digital signal processor (DSP), or other processing component, processes these various signals, such as for display on computer system 1400 or transmission to other devices via a communication link 1418. Processor 1412 may also control transmission of information, such as cookies or IP addresses, to other devices.

Components of computer system 1400 also include a system memory component 1414 (e.g., RAM), a static storage component 1416 (e.g., ROM), and/or a disk drive 1417. Computer system 1400 performs specific operations by processor 1412 and other components by executing one or more sequences of instructions contained in system memory component 1414. Logic may be encoded in a computer readable medium, which may refer to any medium that participates in providing instructions to processor 1412 for execution. Such a medium may take many forms, including but not limited to, non-volatile media, volatile media, and transmission media. In various implementations, non-volatile media includes optical or magnetic disks, volatile media includes dynamic memory, such as system memory component 1414, and transmission media includes coaxial cables, copper wire, and fiber optics, including wires that comprise bus 1402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1400. In various other embodiments of the present disclosure, a plurality of computer systems 1400 coupled by communication link 1418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

In some embodiments, the data adaptor discussed above with reference to FIGS. 1-14 may be implemented on the computer system 1400 of FIG. 18.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An enterprise server, comprising:
a computer memory storage component configured to store computer programming instructions; and
a computer processor component operatively coupled to the computer memory storage component, wherein the computer processor component is configured to execute code to perform the following operations:
accessing a configuration file, wherein the configuration file specifies configuration information for constructing a data adaptor that includes a data adaptor source, a data adaptor sink, and a data adaptor channel coupled between the data adaptor source and the data adaptor sink;
constructing the data adaptor using a data ingestion framework integrated into an application and based on the configuration file, the configuration file further specifies a data store and a data sink and the configuration file is stored external to the application;
retrieving, via the data adaptor, data from the data store; and writing, via the data adaptor, the retrieved data to the data sink different from the data store;
wherein one or more sink data handlers include:
a first sink data handler configured to filter, scrub, or restructure the data received from the data adaptor channel; and
a second sink data handler configured to write the filtered, scrubbed, or restructured data to the data sink.

2. The enterprise server of claim 1, wherein the configuration file is written in JavaScript Object Notation (JSON).

3. The enterprise server of claim 1, wherein:
the data adaptor source is configured to manage one or more source data handlers; and
the data adaptor sink is configured to manage one or more sink data handlers.

4. The enterprise server of claim 3, wherein the one or more source data handlers and the one or more sink data handlers are coupled together via the data adaptor channel.

5. The enterprise server of claim 4, wherein:
the one or more source data handlers include:
a first source data handler configured to import the data from the data store; and
a second source data handler configured to write the imported data to the data adaptor channel.

6. The enterprise server of claim 1, wherein the constructing of the data adaptor comprises constructing a data adaptor that includes multiple data adaptor sinks that are each coupled to the data adaptor source via a respective data adaptor channel.

7. The enterprise server of claim 1, wherein the data store and the data sink are different types of data sources.

8. A method of ingesting data in an enterprise server environment, comprising:
accessing a configuration file, wherein the configuration file specifies configuration information for constructing a data adaptor that includes a data adaptor source, a data adaptor sink, and a data adaptor channel coupled between the data adaptor source and the data adaptor sink;
constructing the data adaptor using a data ingestion framework integrated into an application and based on the configuration file, the configuration file further specifies a data store and a data sink and the configuration file is stored external to the application;
retrieving, via the data adaptor, data from the data store;
writing, via the data adaptor, the retrieved data to the data sink different from the data store;
filtering, scrubbing, or restructuring the data received from the data adapter channel by a first sink data handler;

writing the filtered, scrubbed, or restructured data to the data sink by a second sink data handler: and wherein the accessing, the constructing, the retrieving, and the writing are performed by one or more electronic processors.

9. The method of claim 8, wherein the configuration file is written in JavaScript Object Notation (JSON).

10. The method of claim 8, wherein:
the data adaptor source is configured to manage one or more source data handlers; and
the data adaptor sink is configured to manage one or more sink data handlers.

11. The method of claim 10, wherein the one or more source data handlers and the one or more sink data handlers are coupled together via the data adaptor channel.

12. The method of claim 8, further comprising:
importing the data from the data store by a first source data handler; and
writing the imported data to the data adaptor channel by a second source handler.

13. The method of claim 8, wherein the constructing of the data adaptor comprises constructing a data adaptor that includes multiple data adaptor sinks that are each coupled to the data adaptor source via a respective data adaptor channel.

14. The method of claim 8, wherein the data store and the data sink are different types of data sources.

15. An apparatus comprising a non-transitory, tangible computer readable storage medium storing a computer program, wherein the computer program contains instructions that when executed, cause the apparatus to perform operations perform the following steps to ingest data in an enterprise server environment, the operations comprising:
accessing a configuration file, wherein the configuration file specifies configuration information for constructing a data adaptor that includes a data adaptor source, a data adaptor sink, and a data adaptor channel coupled between the data adaptor source and the data adaptor sink;
constructing the data adaptor using a data ingestion framework integrated into an application and based on the configuration file, the configuration file further specifies a data store and a data sink and the configuration file is stored external to the application;
retrieving, via the data adaptor, data from a data source; and
writing, via the data adaptor, the retrieved data to a data sink, wherein the data and the data sink are different types of data sources;
wherein, one or more sink data handlers include:
a first sink data handler configured to filter, scrub, or restructure the data received from the data adapter channel; and
a second sink data handler configured to write the filtered, scrubbed, or restructured data to the data sink.

16. The apparatus of claim 15, wherein the configuration file is written in JavaScript Object Notation (JSON).

17. The apparatus of claim 15, wherein:
the data adaptor source is configured to manage one or more source data handlers; and
the data adaptor sink is configured to manage one or more sink data handlers.

18. The apparatus of claim 17, wherein the one or more source data handlers and the one or more sink data handlers are coupled together via the data adaptor channel.

19. The apparatus of claim 18, wherein: the one or more source data handlers include:
a first source data handler configured to import the data from the data source; and
a second source data handler configured to write the imported data to the data adaptor channel.

20. The apparatus of claim 15, wherein the constructing of the data adaptor comprises constructing a data adaptor that includes multiple data adaptor sinks that are each coupled to the data adaptor source via a respective data adaptor channel.

* * * * *

UNITED STATES PATENT AND TRADEMARK OFFICE
CERTIFICATE OF CORRECTION

PATENT NO. : 9,990,383 B2
APPLICATION NO. : 14/812360
DATED : June 5, 2018
INVENTOR(S) : John Peter Brinnand It is certified that error appears in the above-identified patent and that said Letters Patent is hereby corrected as shown below:

In the Claims

In Column 36, Line 40, in Claim 5, delete "handier" and insert -- handler --, therefor.

In Column 36, Line 66, in Claim 8, delete "adapter" and insert -- adaptor --, therefor.

In Column 37, Line 2, in Claim 8, delete "handler:" and insert -- handler; --, therefor.

In Column 38, Line 13, in Claim 15, delete "adapter" and insert -- adaptor --, therefor.

Signed and Sealed this
Sixteenth Day of October, 2018

Andrei Iancu
*Director of the United States Patent and Trademark Office*